United States Patent
Panzer

(10) Patent No.: US 9,299,060 B2
(45) Date of Patent: Mar. 29, 2016

(54) AUTOMATICALLY SUGGESTING GROUPS BASED ON PAST USER INTERACTION

(71) Applicant: Google Inc., Mountain View, CA (US)

(72) Inventor: John Panzer, Mountain View, CA (US)

(73) Assignee: Google Inc., Mountain View, CA (US)

( * ) Notice: Subject to any disclaimer, the term of this patent is extended or adjusted under 35 U.S.C. 154(b) by 264 days.

(21) Appl. No.: 13/651,199

(22) Filed: Oct. 12, 2012

(65) Prior Publication Data
US 2014/0108562 A1 Apr. 17, 2014

(51) Int. Cl.
*G06Q 10/10* (2012.01)
*G06Q 50/00* (2012.01)

(52) U.S. Cl.
CPC ............... *G06Q 10/10* (2013.01); *G06Q 50/01* (2013.01)

(58) Field of Classification Search
CPC ......... G06F 15/16; G06F 17/30; G06Q 50/01; G06Q 10/10; H04L 12/58; H04L 12/588; H04L 51/32; H04L 67/22; H04L 67/306
USPC .......... 707/748, 749, 751, E17.032; 709/203, 709/204, 206; 715/753
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,742,468 B2 | 6/2010 | Vagelos | |
| 7,908,327 B2 | 3/2011 | Kucharewski et al. | |
| 8,224,916 B2 | 7/2012 | Kucharewski et al. | |
| 8,812,404 B2 | 8/2014 | Aleong et al. | |
| 8,813,187 B1 | 8/2014 | Daniel | |

(Continued)

FOREIGN PATENT DOCUMENTS

| KR | 1020120045861 | 5/2012 |
|---|---|---|
| WO | WO0279984 | 10/2002 |
| WO | 2005086723 | 9/2005 |

OTHER PUBLICATIONS

International Search Report and Written Opinion, PCT/US2013/064652, Jan. 20, 2014, 10 pages.

(Continued)

*Primary Examiner* — Brian J Gillis
*Assistant Examiner* — Gil H. Lee
(74) *Attorney, Agent, or Firm* — Patent Law Works LLP

(57) ABSTRACT

An example implementation includes processing message-related information of a first user for a cluster of related users and determining interaction levels for the cluster of related users. The interaction levels describe a level of interaction between the first user and the related users of the cluster. The users of the cluster are ranked based on the interaction levels and a group suggestion is generated suggesting a group be created on a social networking service based on the ranking of the cluster of related users. The group suggestion is sent to the first user for presentation and a response is received from the first user including user input provided in response to the group suggestion being sent. A group of users is created on the social networking service based on the response.

24 Claims, 8 Drawing Sheets

(56) References Cited

U.S. PATENT DOCUMENTS

| | | | |
|---|---|---|---|
| 9,087,131 | B1 | 7/2015 | Gundotra et al. |
| 9,117,197 | B1 | 8/2015 | Sharma |
| 2002/0137490 | A1 | 9/2002 | Gallant |
| 2002/0143874 | A1 | 10/2002 | Marquette et al. |
| 2004/0236729 | A1* | 11/2004 | Dingledine ............ G06F 19/24 |
| 2004/0258220 | A1 | 12/2004 | Levine et al. |
| 2005/0152521 | A1 | 7/2005 | Liljestrand |
| 2006/0026288 | A1 | 2/2006 | Acharya et al. |
| 2006/0069753 | A1 | 3/2006 | Hu et al. |
| 2006/0077957 | A1 | 4/2006 | Reddy et al. |
| 2006/0206604 | A1 | 9/2006 | O'Neil et al. |
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |
| 2008/0056475 | A1 | 3/2008 | Brannick et al. |
| 2008/0091723 | A1 | 4/2008 | Zuckerberg et al. |
| 2008/0192656 | A1 | 8/2008 | Vagelos |
| 2010/0169161 | A1 | 7/2010 | Sacco |
| 2011/0098156 | A1 | 4/2011 | Ng et al. |
| 2011/0153423 | A1 | 6/2011 | Elvekrog et al. |
| 2011/0246574 | A1* | 10/2011 | Lento et al. .................. 709/204 |
| 2011/0276396 | A1 | 11/2011 | Rathod |
| 2011/0288935 | A1 | 11/2011 | Elvekrog et al. |
| 2011/0288937 | A1 | 11/2011 | Manoogian, III et al. |
| 2011/0289011 | A1 | 11/2011 | Hull et al. |
| 2012/0011212 | A1 | 1/2012 | He et al. |
| 2012/0158751 | A1* | 6/2012 | Tseng ........................... 707/751 |
| 2012/0166532 | A1* | 6/2012 | Juan et al. ..................... 709/204 |
| 2013/0013686 | A1* | 1/2013 | Kucharewski et al. ....... 709/204 |
| 2013/0287269 | A1 | 10/2013 | Gossweiler et al. |
| 2013/0318180 | A1* | 11/2013 | Amin et al. ................... 709/206 |
| 2014/0067943 | A1* | 3/2014 | Jackson et al. ............... 709/204 |
| 2014/0089400 | A1 | 3/2014 | Yan et al. |

OTHER PUBLICATIONS

Adamic et al., "A Social Network Caught in the Web," Internet Journal, First Monday, Jun. 2, 2003, vol. 8, No. 6, pp. 1-22.

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "Cinema: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

* cited by examiner

AUTOMATICALLY SUGGESTING GROUPS BASED ON PAST USER INTERACTION

BACKGROUND

The present disclosure relates to relates to automatically suggesting groups based on past user interaction.

In recent years, online social networking services have become a popular mechanism for interaction between users over the Internet. For example, users can use the functionality of a social networking service to interact with friends and relatives by posting thoughts, news articles, photos, and videos, about oneself or others, meet others with similar interests, and network with colleagues. In some cases, users organize their contacts on a social networking service by manually sorting them into groups. However, this can be burdensome and time consuming due to the number of contacts these users may have on the social network. Additionally, users may be less familiar with some contacts that they have on the social network and may be unsure on how to organize them. As a result, users often forgo organizing their contacts into groups and are thus unable to benefit from group-related functionalities that might be offered by the social networking service.

SUMMARY

According to one innovative aspect of the subject matter being described in this disclosure, a system processes message-related information of a first user for a cluster of related users and determines interaction levels for the cluster of related users. The interaction levels describe a level of interaction between the first user and the related users of the cluster. The system ranks the cluster of related users based on the interaction levels and generates a group suggestion suggesting a group be created on a social networking service based on the ranking of the cluster of related users. The group suggestion is sent by the system to the first user for presentation and a response is received by the system from the first user that includes user input provided in response to the group suggestion being sent. The system creates a group of users on the social networking service based on the response.

In general, another innovative aspect of the subject matter described in this disclosure may be embodied in methods that include processing message-related information of a first user for a cluster of related users; determining interaction levels for the cluster of related users, the interaction levels describing a level of interaction between the first user and the related users of the cluster; ranking the cluster of related users based on the interaction levels; generating a group suggestion suggesting a group be created on a social networking service based on the ranking of the cluster of related users; sending the group suggestion to the first user for presentation; receiving a response from the first user including user input provided in response to the sending of the group suggestion; and creating a group of users on the social networking service based on the response.

Other implementations of one or more of these aspects include corresponding systems, apparatus, and computer programs, configured to perform the actions of the methods, encoded on computer storage devices.

These and other implementations may each optionally include one or more of the following features. For instance, the operations may further include processing the plurality of electronic messages for one or more past interactions between the first user and a plurality of other users and identifying the cluster of related users based on the one or more past interactions; processing the conversational content and the user data for the one or more past interactions; receiving a group request from the first user requesting the group suggestion be provided; aggregating the message-related information from one or more information sources storing electronic messages of the first user; processing the message-related information for a group name; generating the group suggestion to reflect the ranking of the related users of the cluster; processing the user input included in the response from the first user for one or more revisions to the group suggestion; generating accuracy improvement data based on the one or more revisions; and generating a second group suggestion suggesting a second group be created on the social networking service based on the message-related information and the accuracy improvement data.

For instance, the features may further include that the message-related information describes a plurality of electronic messages; the message-related information includes conversational content and user data associated with the plurality of electronic messages; the generating of the group suggestion is based on the group name; and the electronic messages include one or more of electronic mail messages, SMS/MMS messages, instant messages, social network posts, social network notifications, and micro blog posts.

These implementations are particularly advantageous in a number of respects. For instance, they can incentivize a user of the social network to organize his or her contacts into groups by automatically suggesting groups having users that the user is familiar with; can provide a more satisfying and engaging experience to the user by providing updates to the user's content stream from users included in the groups created from the suggestions; can continuously improve future group suggestions based on the groups that are created from past suggestions; can automatically suggest additional users that the user is familiar with as additions to a suggested or existing group, etc. It should be understood, however, that this list of features and advantages is not all-inclusive and many additional features and advantages are within the scope of the present disclosure. Moreover, it should be noted that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
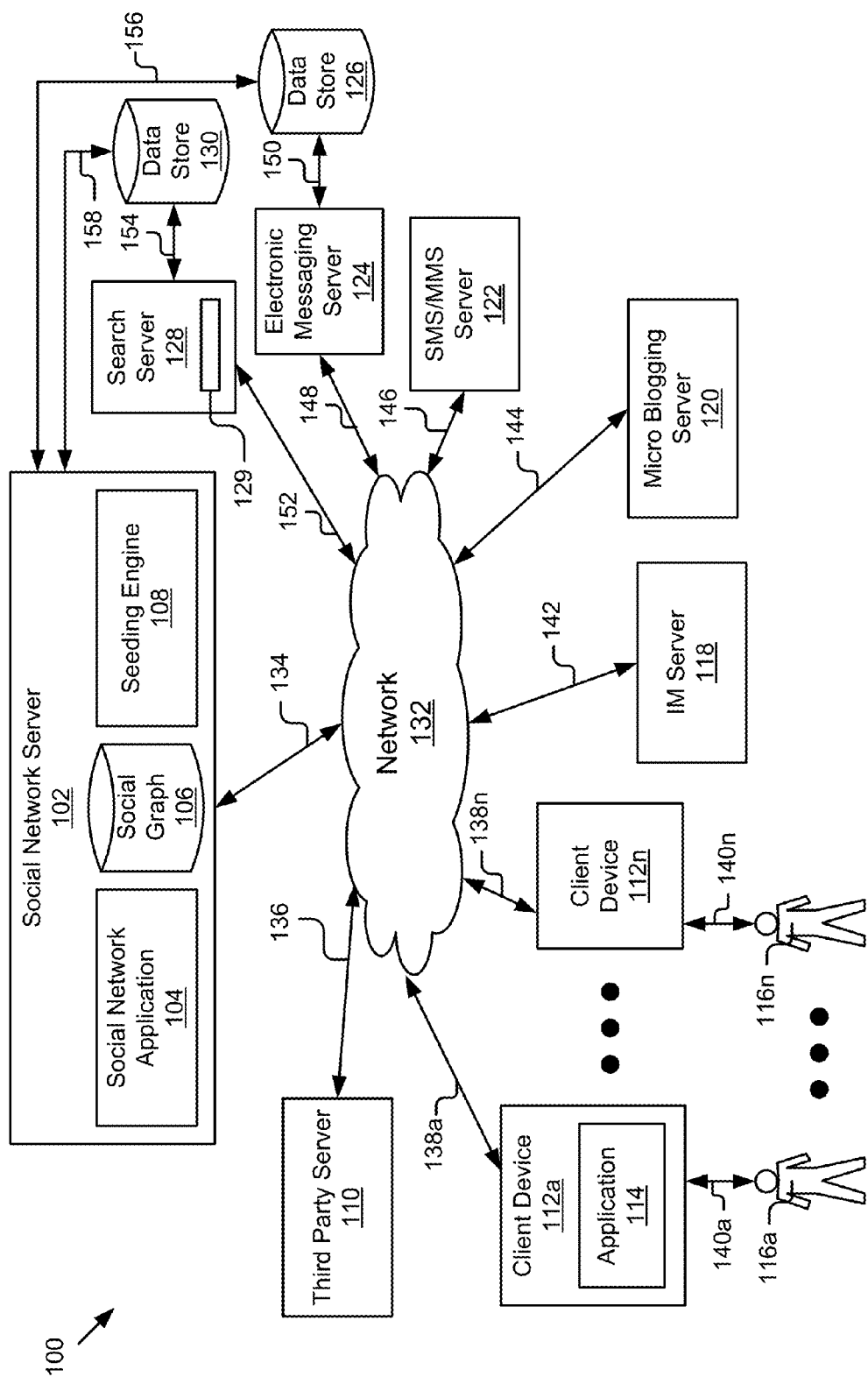
FIG. 1 is a block diagram illustrating an example system for automatically suggesting groups based on past user interaction.

FIG. 1 is a block diagram illustrating an example system 100 for automatically suggesting groups based on past user interaction. In the depicted implementation, the system 100 includes a social network server 102; a third party server 110; client devices 112a . . . 112n (also referred to herein individually and collectively as 112) that are accessible by users 116a . . . 116n (also referred to herein individually and collectively as 116); an Instant Messaging (IM) server 118; a micro blogging server 120; a Short Message Service (SMS)/Multimedia Messaging Service (MMS) server 122; an electronic messaging server 124; and a search server 128. In the depicted implementation, the entities 102, 110, 112a . . . 112n, 118, 120, 122, 124, and 128 are electronically communicatively coupled via a network 132. The system 100 illustrated in FIG. 1 is representative of an example system for automatically suggesting groups based on past user interaction, and it should be understood that a variety of different system environments and configurations may be employed and are within the scope of the present disclosure. Other implementations may include additional or fewer computing devices, services, and/or networks. Further, while the present disclosure is described above primarily in the context of activities related to social networking, it is applicable to any type of electronic communication within or between entities of a network.

In some implementations, the entities of the system 100 may use a cloud-based architecture where one or more computer functions or routines are performed by remote computing systems and devices at the request of a local computing device. For example, a client device 112 may be a computing device having a limited set of hardware and/or software resources and may access hardware and/or software resources provided across the network 132 by other computing devices and resources, including, for instance, other client devices 112, the social network server 102, the third party server 110, the electronic messaging server 124, the search server 128, or any other entities of the system 100. A client device 112 may access these resources through an access program, including, for example, the user application 114. This access program may include, for example, a web browser or another native program operating on the device for sending and receiving information via a network, and the results of any computer functions or resources may be delivered to the user of the client device 112 via the access program. User interfaces of one such example access program are further described below with reference to at least FIGS. 6 and 7. In some implementations, the social network server 102, the electronic messaging server 124 or any other entity of the system 100 may be a cloud-based, distributed computing system having dynamically scalable and virtualizable resources, and various functionality of the social network server 102, the social network application 104, the electronic messaging server 124, the data stores 126 and 130, and/or any data, data storage, software or software routine may be processed and supplemented by computing systems and devices distributed over the network 132.

As depicted in FIG. 1, the social network server 102, the third party server 110, the IM server 118, the micro blogging server 120, the SMS/MMS server 122, the electronic messaging server 124, and the search server 128 are respectively coupled to the network 132 via signal lines 134, 136, 142, 144, 146, 148, and 152, for interaction with each other and the other components of the system 100. The social network server 102, the third party server 110, the IM server 118, the micro blogging server 120, the SMS/MMS server 122, the electronic messaging server 124, and the search server 128 may include one or more computing devices having one or more processors and one or more storage devices storing data or instructions for execution by the one or more processors.

For example, the one or more computing devices may be a hardware server, a server array or any other computing device, or group of computing devices, having data processing, storing and communication capabilities. A computing device may also be a virtual server (i.e., a virtual machine) implemented via software. For example, the virtual server may operate in a host server environment and accesses the physical hardware of the host server including, for example, a processor, memory, storage, network interfaces, etc., via an abstraction layer (e.g., a virtual machine manager). It should be understood that any of the entities of the system 100 can be stored in any combination of devices and servers or in one device or server.

In the depicted implementation, the social network server 102 includes a social network application 104, a social graph 106, and a seeding engine 108. The social network application 104 cooperates with the social graph 106 to provide functionality for a social networking service (also referred to as a social network) and the seeding engine 108 cooperates with the social network application 104 to seed users with groups of familiar contacts based on their past interactions. Additional structure and functionality of the social network application 104, the social graph 106, and the seeding engine 108 are further described below with reference to at least FIG. 2.

While only the social network server 102 is depicted in FIG. 1 as including a seeding engine 108, it should be understood that this implementation is provided by way of example and that any single entity or any number of entities may include an instance of the seeding engine 108. For example, the electronic messaging server 124 or the third party server 110 could store and operate an instance of the seeding engine 108, and provide access to the functionality of it to the other entities of the system 100 via an application programming interface (API). Additional structure and functionality of the seeding engine 108 is further described below with reference to at least FIG. 2.

The third party server 110 is a computing device or system for providing various computing functionalities, services, and/or resources to the other entities of the system 100. In some implementations, the third party server 110 is a server hosting a network-based software application operable to provide the computing functionalities, services, and/or resources, and to send data to and receive data from the other entities of the network 132. For example, the third party server 110 may operate a software application for managing a federated account and identity; blogging; social networking; micro blogging; photo management; video, music and multimedia hosting, distribution, and sharing; business services; news and media distribution; or any combination of the foregoing services. It should be understood that the third party server 110 is not limited to providing the above-noted services and may include any other network-based or cloud-based service, including, for example, those provided by the other entities of the system 100. For simplicity, a single block for the third party server 110 is shown in FIG. 1. However, in this or other implementations, several distinct third party servers (not shown) may be coupled to the network via distinct signal lines which operate applications providing distinct or competing functionalities and/or resources.

The client devices 112a . . . 112n are computing devices having data processing and data communication capabilities. In the depicted implementation, the client device 112a is coupled to the network 132 via signal line 138a, and the user 116a's interactions with client device 112a are depicted by line 140a; and the client device 112n is coupled to the network 132 via signal line 138n, and the user 116n's interactions with the client device 112n are depicted by line 140n.

In some implementations, a client device 112 includes a workstation computer, a desktop computer, a laptop computer, a netbook computer, a tablet computer, a smartphone, a set-top box/unit, an Internet Protocol-connected smart TV including a computer processor capable of receiving viewer input, accessing video content on computer networks (e.g., the Internet), and executing software routines to provide enhanced functionality and interactivity to viewers, or the like. In other implementations, different client devices 112a . . . 112n include different types of computing devices. For example, the client device 112a is a laptop and the client device 112n is a tablet computer. In some implementations, the client device 112 is a handheld wireless computing device which is capable of sending and receiving voice and/or data communications.

The client device 112 may include a computer processor, a memory, a power source, and a communication unit including one or more network interfaces for interacting with the network 132, including, for example, wireless transceivers to broadcast and receive network data via radio signals. The client device 112 may also include one or more of a graphics processor; a high-resolution touchscreen; a physical keyboard; forward and rear facing cameras; sensors like accelerometers and/or gyroscopes; a GPS receiver; a Bluetooth® module; memory storing applicable firmware; and various physical connection interfaces (e.g., USB, HDMI, headset jack, etc.); etc. Additionally, an operating system for managing the hardware and resources of the client device 112, application programming interfaces (APIs) for providing applications access to the hardware and resources, a user interface engine for generating and displaying interfaces for user interaction and input, and applications including, for example, applications for making phone calls, video calls, web browsing, messaging, social networking, gaming, capturing digital video and/or images, etc., may be stored and operable on the client device 112. While FIG. 1 illustrates two or more client devices 112, the present disclosure applies to any system architecture having one or more client devices 112.

In the depicted implementation, the client device 112a contains a user application 114 executable by a processor (not shown) of the client device 112 to provide for user interaction, and to send and receive data via the network 132. In particular, the user application 114 is operable to instruct the client device 112 to render user interfaces, receive user input, and send information to and receive information from the social network server 102 and the other entities of the system 100. While in the depicted implementation, just the client device 112a is depicted as including the user application 114, any number of client devices 112 may include an instance of the user application 114. In some implementations, the user application 114 is client code operable in a web browser. In these or other implementations, the user application 114 is stored in a memory (not shown) of the client device 112a and is accessible and executable by a processor (not shown).

In some implementations, the user application 114 generates and presents user interfaces to the user 116a via a display (not shown). For example, the user application 114 may generate and present the user interfaces 600 and 700 depicted in FIGS. 6A-B and 7, respectively, based at least in part on information received from the social network server 102 via the network 132. In some implementations, the user application 114 is code operable in a browser launched on the client device 112a, the browser receives interface instructions from the social network application 104 or the seeding engine 108 of the social network server 102 via the network 132 in the form of a mark-up language (e.g., HTML, XML, etc.), style sheets (e.g., CSS, XSL, etc.), graphics, and/or scripts (e.g., JavaScript, ActionScript, etc.), and the browser interprets the interface instructions and renders an interactive Web User Interface (WUI) for display on the client device 112a based thereon. In other implementations, some or all of the interface instructions are provided by the user application 114 while the substantive information is provided by the social network server 102. Other variations are also contemplated and within the scope of this disclosure. The user application 114 is also operable to receive input signals from the user 116a via an input device (not shown) of the client device 112a, and to send information to the social network application 104 and the seeding engine 108 via a communication unit (not shown) (e.g., one like or substantially similar to the communication unit 218).

The IM server 118 and the SMS/MMS server 122 are computing devices for sending, receiving, and/or relaying messages between client devices 112. The IM server 118 and/or the SMS/MMS server 122 may cooperate with client software operable on the client devices 112 to generate messages including textual, graphical, and audio and/or video data based on user input and send the messages to the designated recipient client devices 112. In some implementations, the client devices 112 are handheld wireless devices coupled to a transceiver node of a mobile network included in the network 132 via a control, voice, and/or data channel to send and receive messages. In some examples, the messages sent via the IM server 118 may be sent, at least in part, via Extensible Messaging and Presence Protocol (XMPP), Session Initial Protocol (SIP), Internet Relay Chat (IRC) protocol, hypertext transfer protocol (HTTP), hypertext transfer protocol secure (HTTPS), etc., and the messages sent via the SMS/MMS server 122 may be sent via short messaging service (SMS), multimedia messaging service (MMS), eXtended Messaging Service (XMS), wireless access protocol (WAP), etc.

The electronic messaging server 124 is a computing device for sending, receiving, managing, and providing access to electronic mail messages. While not depicted, the electronic messaging server 124 may include an electronic message application operable to send, store, receive, manage, and provide access to the electronic mail messages. In the depicted implementation, the electronic messaging server 124 stores electronic mail messages received, composed, saved, and/or sent by users in a data store 126. The data store 126 is an information source for storing and providing access to electronic message-related information. In some implementations, the electronic messaging server 124 and/or the social network server 102 can manipulate, i.e., store, query, update, and/or delete data, information stored by the data store 126 using programmatic operations. In some implementations, the data store 126 includes a database management system (DBMS) operable on the electronic messaging server 124 or another computing device and storable in a memory thereof (not shown). For example, the DBMS could be a structured query language (SQL) DBMS. In these implementations, information stored in the DBMS is stored in multi-dimensional tables comprised of rows and columns, and can be manipulated, i.e., inserted, queried, updated and/or deleted using programmatic operations (e.g., SQL queries and statements).

The seeding engine 108 may cooperate with the electronic messaging server 124 to retrieve message-related information including, for example, electronic mail messages and information describing the electronic mail messages, from the data store 126. For example, the seeding engine 108 may signal the electronic messaging server 124 to aggregate electronic mail messages which contain various information and provide the messages and/or information to the seeding engine 108. In other implementations, the data store 126 is accessible by both the seeding engine 108 and the electronic messaging server 124, and the seeding engine 108 may directly access and query the data store 126 for electronic mail messages containing various information. In some implementations, the electronic messaging server 124 may transmit electronic mail messages and/or information about the messages between any of the constituent elements of the system 100. In some implementations, electronic mail messages are transmitted by the electronic messaging server 124 and other elements of the system 100 over the network 132 using protocols including, for example, transmission control protocol/Internet protocol (TCP/IP), HTTP, HTTPS, secure shell (SSH), file transfer protocol (FTP), internet message access protocol (IMAP), simple mail transfer protocol (SMTP), post office protocol (POP), WebDAV, etc. While only one electronic messaging server 124 is depicted, any number of electronic messaging servers 124 could be included in the system 100.

In the depicted implementation, the search server 128 includes a search engine 129 for retrieving results that match search terms from the Internet. The search server 128 may be a server, server array or any other computing device, or group of computing devices, having data processing, storing, and communication capabilities. The other entities of the system 100 may interact with the search engine 129 via the network 132 to retrieve the results matching various search terms provided to the search engine 129. For example, the seeding engine 108 may signal the search engine 129 to provide search results matching a particular person's name. This person may be an individual included in a cluster identified by the cluster processor 204, as discussed further below with reference to at least FIG. 2. For example, a user's name could be provided as a search term, and the top hits for that user's name could be provided by the search server 128 to the seeding engine 108. Although, only one search server 128 is shown, it should be understood that multiple search servers 128 may be included in the system 100.

The data store 130 is an information source that stores and provides access to an indexed copy of the network-based and network-accessible content hosted by the entities coupled to the network 132. In some implementations, the information stored in the data store 130 is retrieved and stored in part by a web crawler. In some implementations, the data stored in the data store 130 can be accessed via the search server 128, as discussed above. In other implementations, the data stored in the data store 130 can be accessed directly. For example, in the depicted implementation, the social network server 102, the social network application 104, and/or the seeding engine 108 can access the data stored in the data store 130 directly via signal line 158.

The network 132 is a network for interconnecting computing nodes. The network 132 may have any number of configurations or topologies. For example, the network 132 may have a star, token ring, or other known topology or hybrid thereof. The network 132 may include a local area network (LAN), a wide area network (WAN) (e.g., the Internet), and/or any other interconnected data path across which multiple devices may communicate. The network 132 may be coupled to or include a mobile (cellular) network including distributed radio networks and a hub providing a wireless wide area network (WWAN), or other telecommunications networks. In some implementations, the network 132 may include Bluetooth® communication networks for sending and receiving data. The network 132 may transmit data using a variety of different communication protocols including, for example, various Internet layer, transport layer or application layer protocols. For example, the network 132 may transmit data using user datagram protocol (UDP), transmission control protocol (TCP), HTTP, HTTPS, SSH, FTP, WebSocket (WS), WAP, IMAP, SMTP, POP, SMS protocol, MMS protocol, XMS protocol, or other known protocols. Client devices 112 may couple to and communicate via the network 132 using a wireless and/or wired connection. In some implementations, the client devices 112 include a wireless network interface controller for sending and receiving data packets to an access point of the network 132. For example, the client devices 112 may be Wi-Fi™ enabled devices which connect to wireless local area networks (WLANs), including, for example, wireless hotspots, included in the network 132. The client devices 112 may also include one or more wireless mobile network interface controllers for sending and receiving data packets via a wireless wide area network (WWAN) of the network 132.

The entities 102, 110, 118, 120, 122, 124, and/or 128 may require users to register for a user account to access various functionalities and services provided by these entities. For example, to register, a credential module included in and operated a given entity of the system may require a user 116 to provide identifying information, for example, a valid electronic mail address and password, and the application may test the validity of the electronic mail address by sending the a confirmation message to the address containing instructions for confirming the account (e.g., selecting a hyperlink to a confirmation webpage operated by the service provider). Once registered, the credential module may require a user seeking access to the service operated by this entity to authenticate by inputting the identifying information in an associated user interface.

Figure 2:
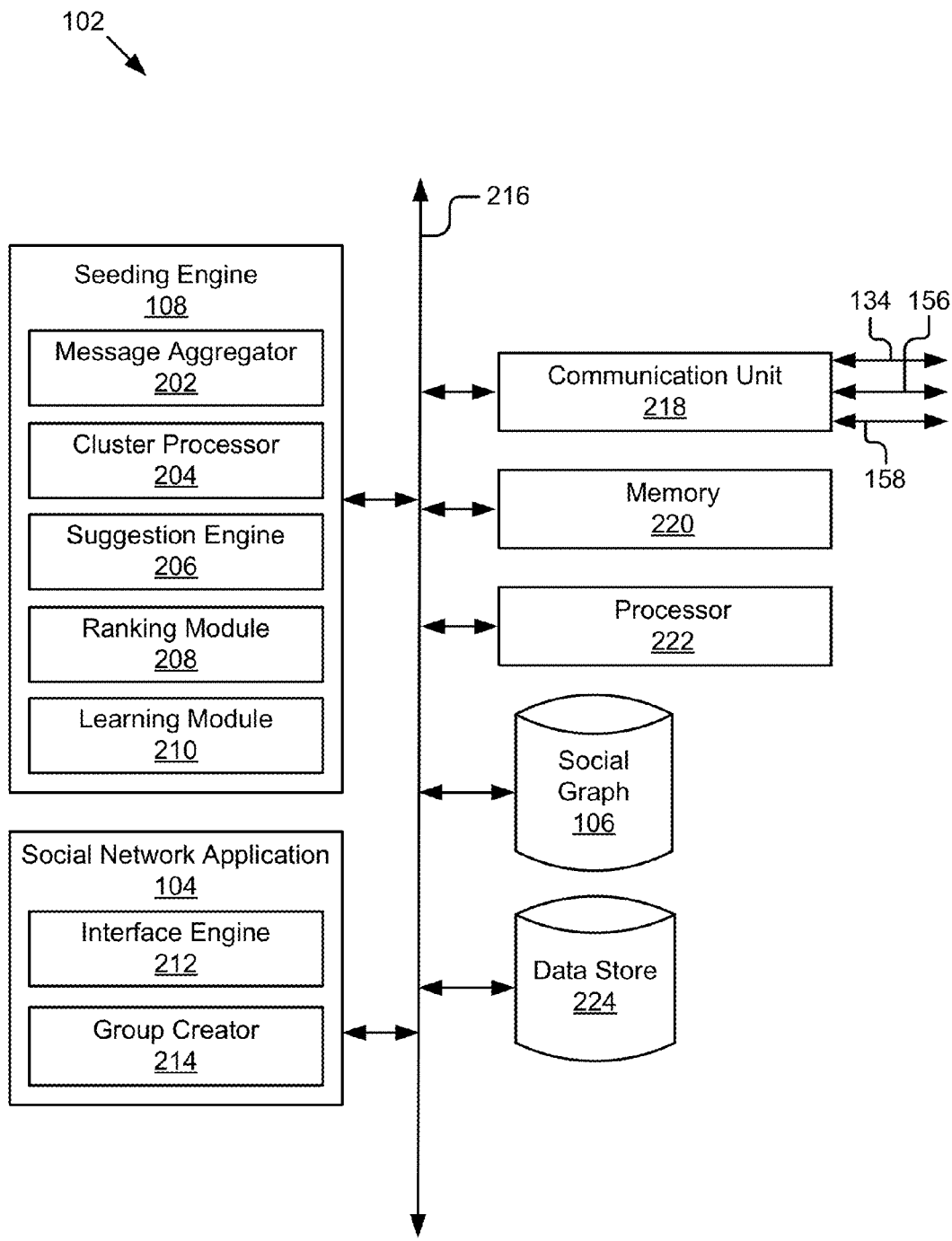
FIG. 2 is a block diagram illustrating an example social network server.

FIG. 2 is a block diagram of an example social network server 102. In the depicted implementation, the social network server 102 is a computing device which includes the social network application 104, the social graph 106, the seeding engine 108, a communication unit 218, a memory 220, a processor 222, and a data store 224. In the depicted implementation, the components 106, 218, 220, 222, and 224 are communicatively coupled via a bus 216. In various implementations, the social network application 104, the seeding engine 108, and their respective sub-components 202, 204, 206, 208, 210, 212, and 214 may be sets of instructions stored in the memory 220 and executable by the processor 222 for communication with the other components of the social network server 102; may be implemented via one or more application specific integrated circuits (ASICs) coupled to the bus 216 for cooperation and communication with the other components of the social network server 102; sets of instructions stored in one or more discrete memory devices (e.g., a PROM, FPROM, ROM) that are coupled to the bus 216 for cooperation and communication with the other components of the social network server 102; a combination thereof; etc.

The bus 216 can include a conventional communication bus for transferring data between components of a computing device or between computing devices, a network bus system including the network 132 or portions thereof, a processor mesh, a combination thereof, etc. In some implementations, the social network application 104, the seeding engine 108, and their respective sub-components 202, 204, 206, 208, 210, 212, and 214, and various software operating on the social network server 102 (e.g., an operating system) may cooperate and communicate via a software communication mechanism implemented in association with the bus 216. The software communication mechanism can include and/or facilitate, for example, inter-process communication, local function or procedure calls, remote procedure calls, an object bus (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The social network server 102 depicted in FIG. 2 is provided by way of example and it should be understood that the social network server 102 may take other forms and include additional or fewer components without departing from the scope of the present disclosure. For example, while not shown, in some implementations, the social network server 102 may include input and output devices (e.g., a computer display, a keyboard and mouse, etc.), various operating systems, sensors, additional processors, and other physical configurations. Additionally, it should be understood that the computer architecture depicted in FIG. 2 is applicable to the other entities of the system 100 with various modifications. For example, the third party server 110, the IM server 118, the micro blogging server 120, the SMS/MMS server 122, the electronic messaging server 124, and/or the search server 128 could have the same or a similar architecture as the social network server 102 depicted in FIG. 2, including, for instance, the processor 222, the memory 220, the communication unit 218, and a data store 224 coupled via a bus 216.

The communication unit 218 may be a network interface device (I/F) which includes ports for wired connectivity. For example, the communication unit 218 may include a CAT-5 interface, USB interface, and/or SD interface, etc. The communication unit 218 may link the processor 222 to the network 132 that may in turn be coupled to other processing systems. The communication unit 218 may provide connections to the network 132 and to other entities of the system 100 using standard communication protocols including, for example, those discussed with reference to the network 132. In some implementations, the communication unit 218 includes a transceiver for sending wireless signals to and receiving wireless signals from the network 132 using Wi-Fi™, Bluetooth®, cellular communications, etc. In the depicted implementation, the communication unit 218 is coupled to the network 132 via signal line 134 for communication and interaction with the other entities of the system 100, and is coupled to data stores 126 and 130 via signal line 156 and 158, respectively, for direct communication and interaction with those entities.

The memory 220 stores instructions and/or data that may be executed by the processor 222. For example, the memory 220 can store the social network application 104 and the seeding engine 108. The memory 220 is also capable of storing other instructions and data including, for example, an operating system, hardware drivers, other software applications, databases, etc. The memory 220 is coupled to the bus 220 for communication with the processor 222 and the other components of social network server 102. The instructions and/or data may include code for performing any and/or all of the techniques described herein. In particular, the memory 220 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 222. A non-transitory computer-usable storage medium may include any and/or all computer-usable storage media. In some implementations, the memory 220 may include volatile memory, non-volatile memory, or both. For example, the memory 220 may include one or more of a dynamic random access memory (DRAM) device, a static random access memory (SRAM) device, flash memory, a hard disk drive, a floppy disk drive, a CD ROM device, a DVD ROM device, a DVD RAM device, a DVD RW device, a flash memory device, and any other mass storage device known for storing information on a more permanent basis. It should be understood that the memory 220 may be a single device or may include multiple types of devices and configurations.

The processor 222 includes an arithmetic logic unit, a microprocessor, a general purpose controller, or some other processor array to perform computations and provide electronic display signals to a display device (not shown). The processor 222 may be coupled to the bus 216 for communication with the other components of the social network server 102. The processor 222 may process data signals and may have various computing architectures including a complex instruction set computer (CISC) architecture, a reduced instruction set computer (RISC) architecture, or an architecture implementing a combination of instruction sets. Although only a single processor 222 is shown in FIG. 2, multiple processors may be included and each processor may include a single processing core or multiple interconnected processing cores. The processor 222 may be capable of supporting the display of images and the capture and transmission of images, perform complex tasks, including various types of feature extraction and sampling, etc.

A social network is any type of social structure where the users are connected by one or more common features. The common features can include any attribute, interest, preference, or interaction attributable to the users. For example, the common features include relationships/connections, e.g., professional and academic attributes and interests, friendships, familial ties, etc. The common features can also include explicitly-defined relationships and relationships implied by social connections with other online users and entities. The common features can be provided by one or more social networking systems, including, for example, those included in the system 100. In some implementations, the common features are derived from the users' user profiles stored in one or more information sources associated with these social networking systems. A user's user profile can include information specific to that user like personal information, professional information, and interaction data reflecting the user's activity on the social network, etc. For example, the personal information may describe where a user lives, the user's hobbies, relationship status, gender, age, biographical information, etc.; the professional information may describe a user's professional experience and qualifications (e.g., employment history, job title, skills and certifications, education, etc.); and the social network activity may describe a user's content stream posts including content submissions, notifications, messages, comments, positive or negative endorsements for various content posted by other users, etc. Common features between the personal information, professional information, and social network activity of the users can be mapped by the social network application 104 to connect the users.

In situations in which the systems discussed here collect personal information about users, or may make use of personal information, the users may be provided with an opportunity to control whether programs or features collect personal information (e.g., information about a user's social network, social actions or activities, profession, a user's preference, or a user's location), or to control whether and/or how to receive content from a social network server that may be more relevant to the user. In addition, certain data may be treated in one or more ways before it is stored or used, so that personal identifiable information can be determined for the user, or a user's geographic location may be generalized where location information is obtained (such as to a city, ZIP code, or state level), so that a particular location of a user cannot be determined. Thus, the user may have control over how information is collected about the user and used by a social network server.

Each individual user's relationships and connections with other users and entities, explicit or implicit, form a social graph for that user. For example, a user's social graph may include social graph connection information describing connections between that user and the other users of the social network; what common features, attributes, interests, social network activity, etc., connect that user to other users; any groups/sets formed by that user and/or the social network application 104 to categorize or group his or her connections on the social network; the strength of the connections between the user and other users, which can be calculated based on, for example, the degree or degrees (e.g., 1st, 2nd, 3rd, 4th, etc.) of separation between the user and other users, who, if any, the connecting/interstitial users are, the amount or type of interactions between the users, etc.; etc. For instance, the social network application 104 and/or a user (e.g., via an associated user interface), may define groups for users who are work friends, school friends, networking contacts, clients, etc., and user's the social graph may include data reflecting what groups these users belong to. Together, the social graphs of the users form a collective social graph that reflects a mapping of all of the users of the social network and how they are related.

In the depicted implementation, the social graph 106 is an information source for storing and providing access to organized collections of data associated with the social network. In particular, the social graph 106 can store, manage and provide access to the information connecting the users of the social network, including the social graph information, information describing the common features connecting the users the social network, user profile information, etc. The social network application 104, the seeding engine 108, and the other entities of the system 100 can cooperate with the social graph 106 to manipulate this information, i.e., insert, query, update, and/or delete, rows of data using programmatic operations. In some implementations, the information stored by the social graph 106 is stored in the memory 220 of the social network server 102. In other implementations, the social graph 106 is included in a memory, computing device and/or storage system distinct from but accessible by the social network server 102. In various implementations, the social graph 106 stores records, files, objects, data, etc., in cooperation with a file system executable by the processor 222. The social graph 106 may additionally or alternatively include a database management system (DBMS) executable by the processor 222 to manage a collection of records, files, objects, etc. For example, the database could be a structured query language (SQL) DBMS and the data could be manipulated using SQL queries and statements.

The social network application 104 can populate the content stream of one or more users with the posts of other users of the social network. A post included in a content stream by the social network application 104 can include one or more of text, graphics, video, and audio. For example, a user that belongs to a group newly formed from a group suggestion by the group creator 214 can submit a post by submitting a hyperlink (URL) or embed code for an online video he or she endorses, make a comment about another user's post, upload photographs from his/her client device 112, provide a positive or negative endorsement of another user's post, send a message, etc., and the social network application 104 can populate the content stream of the other users of the newly formed group with the post. In some implementations, the social network application 104 populates the content streams of the users of a newly formed group with one another's posts once when they are formed into the group by the group creator 214.

The seeding engine 108 is software, code, logic, or routines for cooperating with the social network application 104 to seed users with groups of familiar contacts based on their past interactions. Among other functionalities, the seeding engine 108 can aggregate message-related information belonging to a given user; identify clusters of related users based on the message-related information; generate group suggestions based on the clusters, provide the group suggestions to a user for review and confirmation; receive a confirmation for a suggested group; learn from additions or deletions made by a user confirming creation of one or more groups to improve future group suggestions; etc. In various implementations, the seeding engine 108 can aggregate message-related information from various information sources and then identify the clusters of related users based on the aggregated information or can access the message-related information from various information sources real-time to identify the clusters.

As depicted in FIG. 2, the seeding engine 108 includes a message aggregator 202, a cluster processor 204, a suggestion engine 206, a ranking module 208, and a learning module 210. The social network application 104 includes an interface engine 212 and a group creator 214. These components 202, 204, 206, 208, 210, 212, and 214 cooperate to provide the functionality described herein. However, the arrangement illustrated in FIG. 2 is provided by way of example, and it should be understood that other arrangements are possible. For example, an alternative arrangement could combine the functionality of one or more of the components 202, 204, 206, 208, 210, 212, and 214 into a single module or engine, integrate the seeding engine 108 into other software applications (e.g., the social network application 104), or vice versa, or further divide the modules into separate additional cooperative components.

In the depicted implementation, the components 202, 204, 206, 208, 210, 212, and 214 are electronically communicatively coupled for cooperation and communication with each other, the social network application 104, the seeding engine 108, the communication unit 218, the memory 220, the processor 222, and/or the data store 224. The seeding engine 108 and its sub-components 202, 204, and 206, 208, and 210, and the social network application 104 and its sub-components 212 and 214 are also coupled for communication with the other entities 102, 110, 112a . . . 112n, 118, 120, 122, 124 and 128 of the system 100 via the network 132. For example, the seeding engine 108 can interact (e.g., via an API) with the electronic messaging server 124, the SMS/MMS server 122, the micro blogging server 120, the IM server 118, and/or the third party server 110 to access, query and/or aggregate information about electronic messages managed by these computing devices. In this example, the seeding engine 108 can interact with a credential module (not shown) associated with these computing devices to authenticate users 116 seeking access to the functionality of the seeding engine 108, and to provide the seeding engine 108 access to information and functionality of these computing devices. In further example, the seeding engine 108 can access, query and/or aggregate information related to the electronic messages stored in the data store 126 either directly via signal line 156 or by interacting with the electronic messaging server 124 via the network 132.

In some implementations, the social network application 104, the seeding engine 108, the message aggregator 202, the cluster processor 204, the suggestion engine 206, the ranking module 208, the learning module 210, the interface engine 212, and/or the group creator 214 are sets instructions executable by the processor 222, or logic included in one or more customized processors, to provide their respective functionalities. In various other implementations, the social network application 104, the seeding engine 108, the message aggregator 202, the cluster processor 204, the suggestion engine 206, the ranking module 208, the learning module 210, the interface engine 212, and/or the group creator 214 are stored in the memory 220 of the social network server 102 and are accessible and executable by the processor 222 to provide their respective functionalities. In any of these implementations, the social network application 104, the seeding engine 108, the message aggregator 202, the cluster processor 204, the suggestion engine 206, the ranking module 208, the learning module 210, the interface engine 212, and/or the group creator 214 are adapted for cooperation and communication with the processor 222 and other components of the social network server 102.

The message aggregator 202 is software, code, logic, or routines for aggregating message-related information from one or more information sources that store electronic messages associated with one or more users. The message-related information may include the electronic messages themselves or any portion thereof, metadata associated with the messages, message summaries, etc. The electronic messages accessed by the message aggregator 202 may be any type or combination of electronic messages sent to users. For example, the electronic messages may include electronic mail messages managed by the electronic messaging server 124 and stored in the data store 126, instant messages stored by the instant message server 118, SMS, MMS or other similar text or multi-media messages stored by the SMS/MMS server 122, micro blogging posts stored by the micro blogging server 120, and social network posts stored in the data store 224, etc.

In some implementations, to aggregate the message-related information, the message aggregator 202 can search one or more information sources for electronic messages associated with a given user. The message aggregator 202 may be coupled via the communication unit 218 and the network 132 to aggregate electronic messages stored or managed by external information sources, including, for example, the third party server 110, the client devices 112a ... 112n, the IM server 118, the micro blogging server 120, the SMS/MMS server 122, the electronic messaging server 124/data store 126, and the search server 128/data store 130. In these or other implementations, electronic messages may be stored in the data store 224, and the message aggregator 202 may search it for message-related information. In some implementations, the message aggregator 202 may cooperate/interact with an information source to search the messages maintained by the information source. For example, the message aggregator 202 may access and query the electronic messages stored and maintained by one or more information sources (e.g., 102, 110, 118, 120, 122, 124, 126, 128, 130 and 222) for message-related information matching various search criteria and patterns via an API. In other implementations, the message aggregator 202 may retrieve message-related information from one or more information sources (e.g., 102, 110, 118, 120, 122, 124, 126, 128, 130 and 222), and may store and search this information independently.

The message aggregator 202 can aggregate message-related information by searching the metadata and message body of the electronic messages for various information or types of information. The metadata may include user data identifying the sender/poster of the message, the recipient(s) of the message, the users who interacted with the message, the date and time the message was sent, the subject, etc. The message body may also include the above-described user data and may further include any type of content for relaying a message. For example, the message body may include textual data, audio data, video data, graphical data, rich text, and/or presentational, procedural, and/or descriptive markup information. In some implementations, the message aggregator 202 may search the electronic messages for predetermined words, terms, keywords, phrases, or other content.

The message aggregator 202 can filter the message-related information being aggregated using one or more criteria. For example, the message aggregator 202 can search for messages of a given user that were distributed to a number of other users (e.g., 4 or more other people), that were forwarded or replied to, that relate to predetermined topics (e.g., a social event) or include certain keywords (e.g., vacation, wedding, game, dinner, etc.). In another example, the message aggregator 202 can also filter out messages of a given user that do not describe or are not related to other users. As a further example, the message aggregator 202, can filter out messages addressed to a business entity, messages that were never responded to, messages identified by the message aggregator 202 as spam or bacn, etc. Spam, also referred to as an unsolicited bulk message or junk message, and is generally a message sent to numerous recipient users who did not request or provide permission to receive the message. Bacn is an electronic message that has been subscribed to and therefore is not unsolicited, but is often disregarded by the recipient. Bacn differs from spam in that it was solicited in some way. For instance, bacn may be sent to a user by organizations or business entities because the user has a registered user account with those organizations or entities. The filtering performed by the message aggregator 202 is advantageous as it can reduce the number of messages/message-related information that need to be processed later by the cluster processor 204 to identify the clusters of related users, and thus reduce the amount of time needed to perform the cluster processing. The cluster processor 204 is discussed in further detail below.

The message aggregator 202 can store the message-related information that was aggregated in a local repository (e.g., the data store 224) for access by the other entities of the social network server 102. The message aggregator 202 may also provide message-related information directly to the cluster processor 204, or the cluster processor 204 may retrieve the data from the data store 224. In some implementations, upon aggregating the message-related information for a given user or a plurality of users, the message aggregator 202 may instruct the cluster processor 204 to process the message-related information by sending a processing signal to the cluster processor 204.

The cluster processor 204 is software, code, logic, or routines for processing the message-related information aggregated by the message aggregator 202 to identify clusters of related users. A cluster of related users is a grouping of users who share a common connection. In some implementations, the users are related/connected because they have interacted by exchanging electronic messages. The message-related information describes the electronic messages, and the cluster processor 204 can process this information to surface these clusters of related users. These clusters can then be used by the suggestion engine 206 to generate corresponding group suggestions, as described further below.

To surface the clusters, the cluster processor 204 can process various attributes of the electronic messages reflected by the message-related information. The attributes relate to the users associated with the electronic messages (e.g., sender and recipients; poster and other contributors, etc.), and the conversational content between the users associated with the electronic messages. These attributes may include the names of the users associated with the electronic messages; identifiers associated with these users; organizations/entities the users are affiliated with; the number of users the messages were distributed to; the length of the message threads that the messages belong to; the number of users that contributed to the conversation reflected by a message thread; the subject matter of the messages; keywords included in the messages; the subject of the messages; the number of times a message was forwarded, replied to, or interacted with; the number of times the same users (or substantially the same users) interacted (in the same or different conversations); how current the messages are; etc.

The cluster processor 204 can use these attributes to surface the clusters that are the most related/relevant, and thus the most valuable to the user associated with the group request. For example, the more the attributes suggest that the users of a given a cluster have interacted with one another, and the more ways these users have interacted, (e.g., via electronic messages, SMS, by interacting with one another on the social network, etc.), the more significant their connection is determined to be by the cluster processor 204. In some implementations, if the cluster processor 204 identifies multiple clusters, it can limit the clusters that are provided to the suggestion engine 206 to those that are the most related.

To identify the users associated with the electronic messages, the cluster processor 204 can process the message-related information for identifying information describing who the users of the clusters are. For example, the cluster processor 204 can determine a user name, electronic mail address, user handle, phone number, given name, or other identifier for each of these other users using identifying information parsed or otherwise determined from the message-related information. This identifying information can then be passed to the suggestion engine 206 for it to use to generate the group suggestions. By way of example, the cluster processor 204 can determine identifying information for the senders of various electronic messages (e.g., SMS messages, IM messages, electronic messages, etc.), the users the electronic messages were addressed to, the users who were copied and blind copied on the electronic messages, the users referenced in the body of the messages, etc. In another example, the cluster processor 204 may determine identifying information for the user who posted an electronic message (e.g., a social network post, a micro blog post, a blog post, a message board post, etc.), the users who interacted with the electronic message by inputting a response (e.g., a comment, a positive affirmation), and the users referenced by the message content of the electronic message or the content of the interactions with the electronic message.

The cluster processor 204 can generate suggestions for one or more group names for use by the suggestion engine 206 when generating a group suggestion. In some implementations, the cluster processor 204 may process the conversational content of the electronic messages described by the message-related information to generate one or more suggestions for a group name. For example, the cluster processor 204 may identify a group name based on keywords, topics, themes, an organization name, etc., included in the message or messages from which a cluster was identified. As a further example, the cluster processor 204 may suggest a group name of "Close Friends" for a cluster of users it has identified because the users had previously exchanged electronic messages about going on vacations together, dining together, planning get-togethers, etc., and the suggestion engine 206 may use the suggested group name and associated cluster when generating the group suggestion. In other implementations, the cluster processor 204 can process identifying information for the users associated with the cluster to determine suggestions for a group name. For example, if all of the users of a cluster share the same last name, the cluster processor 204 can suggest a group name of "Close Family" for the group suggestion based on the cluster. In other implementations, the group suggestion may not include a suggestion for a group name, and may instead request that the user define a name in the suggestion response for the group to be created.

The cluster processor 204 can also access and use supplemental information about the users of a social cluster to perform its processing. In some implementations, the cluster processor 204 may connect to an information source to obtain additional information corresponding to the information parsed from or included in the message-related information. For example, the cluster processor 204 may retrieve a user's public profile information or public information about a user from the other entities 110, 118, 120, 122, 124, and/or 128 of the system 100. The cluster processor 204 may store the supplemental information obtained from these entities in the data store 224 in association with the identifying information derived from the message-related information for the user. This supplemental information can also be accessed by/provided to the ranking engine 208 for ranking the social clusters and the users of the social clusters.

The cluster processor 204 can store the results of the processing performed by it, including data describing the clusters and the related users included in the clusters in the data store 224 for use by the other components 104, 202, 206, 208, 210, 212, and 214 or may provide this information or portions thereof to these other components directly.

The suggestion engine 206 is software, code, logic, or routines for generating and sending a group suggestion responsive to the receipt of a group request. A group request is a request for the seeding engine 108 to generate and provide suggestions of groups of users that can be created on the social network. A group request can be an implicit or explicit request made by a user accessing an interface associated with the social network application 104. For example, by interacting with a content stream interface generated by the user application 114, a user may transmit interaction data reflecting the interactions with the content stream to the social network server 102, and the social network application 104 and/or seeding engine 108 may interpret the interaction data as a group request. Responsive to receiving the group request, the suggestion engine 206 can generate and provide one or more group suggestions. In another example, a user using the user application 114 to view notifications received from other users of the social network, access his or her electronic mail messages, view a group creation interface for organizing the users he or she is connected to on the social network, etc., may send data reflecting a group request, and may receive one or more group suggestions of groups that can be created on the social network responsive thereto.

Providing the group suggestions to the user is advantageous as it encourages the user to form groups to organize the people that he or she interacts with via electronic messages. Further, it should be understood that, like all examples and implementations discussed herein, the examples and implementations described herein are non-limiting and other scenarios and configurations are also possible, contemplated, and fall within the scope of the present disclosure.

The group request can include or be associated with an authentication token authorizing the message aggregator 202 and the cluster processor 204 to respectively aggregate and process/summarize the message-related information. In some implementations, the social network application 104, the electronic messaging server 124, and any of the other entities of the system 100 may authenticate users using a common credential module. For example, the common credential module may be implemented by a federated identity authentication service for authenticating users that is operated by the social network server 102, the electronic messaging server 124, the third party server 110, etc.

In some implementations, the suggestion engine 206 may act as a controller for receiving and processing the group requests. For example, the suggestion engine 206 may receive the group requests, and responsive thereto, may signal the message aggregator 202 to aggregate the message-related information, may signal the cluster processor 204 to process the message-related information, and then may generate group suggestions based on the processing performed by the cluster processor 204. In another example, the message-aggregator 202 and the cluster processor 204 may perform their respective operations in advance; cluster data describing the processing performed by the cluster processor 204, including data describing the clusters of related users and name suggestions for groups based on those clusters, may be stored in the data store 224 for retrieval by the suggestion engine 206; and the suggestion engine 206 may use this cluster data to generate and provide group suggestions for presentation to a given user. In yet another example, the message-aggregator 202 may perform its operations in advance and may store the message-related information in the data store 224, an upon receipt of the group request, the suggestion engine 206 may signal the cluster processor 204 to process the message-related information for clusters of related users and the suggestion engine 206 may generate group suggestions based on these clusters.

In other implementations, the message aggregator 202 may act as the controller and, upon performing its operations, may signal the cluster processor 204 and the suggestion engine 206 to perform their operations, as described herein. Alternatively, the cluster processor 204 may act as the controller and may signal the message aggregator 202 to aggregate the message-related information by sending a signal to it, or may access the message-related information aggregated in advance by the message aggregator 202 from the data store 224, and then may signal the suggestion engine 206 to generate and provide one or more group suggestions. The seeding engine 108 or the social network application 104 could also include a discrete controller to handle the group requests and signal the message aggregator 202, the cluster processor 204, and/or the suggestion engine 206 to perform their respective operations. Information can be passed directly between components 202, 204, and/or 206, or may be stored in the data store 224 for access by these components. Further, it should understood that, like all implementations described herein, the above implementations are provided by way of example, and other configurations are contemplated and fall within the scope of the present disclosure.

A group suggestion suggests two or more users that can be included in a group on the social network. A group is an organized collection of users on the social network. A user can form groups on the social network to organize his or her connections on the social network into relevant categories based on a common feature, including, for example, a relation, interest, etc. For example, via the user application 114, a user form groups on the social network to sort his or her contacts into categories of family, friends, acquaintances, colleagues, school friends, etc.

A group suggestion can be generated by the suggestion engine 206 based at least in part on a cluster surfaced by the cluster processor 204 and/or a group name identified by the cluster processor 204. For example, the group suggestion can describe the group to be created including the users from the cluster that are to be included, proposal(s) for naming the group, and/or information describing how the users were determined to be related by the cluster processor 204. For example, the group suggestion may include any information identified and processed by the cluster processor 204, including, for example, the topics the users of the cluster discussed when exchanging messages, whether the users appear to be related, whether the users belong to the same organizations, the number of messages that were exchanged between the users, the relevant content of the messages, etc. The group suggestion may also be generated to reflect the ranking of the users of the group, as ranked by the ranking module 208. For example, the users of the suggested group may be ordered in order of rank and may include indicia of each user's rank (e.g., a score, a label, etc.). The group suggestion may also include, for each suggested group member, electronic links to a social network user profile of the member and/or contact information for the member.

In generating a suggestion for a group, the suggestion engine 206 can identify whether the users of a given social cluster are registered. In some implementations, the suggestion engine 206 can use the registration information for each user of the social cluster stored and maintained in the data store 224 by a registration engine (not shown) storable in the memory 220 and operable by the processor 222 of the social network application 104. In other implementations, the suggestion engine 206 can determine whether the users of a cluster are registered users of the social network by interacting directly with a registration engine (not shown) of the social network application 104. For example, the suggestion engine 206 may provide the identifying information retrieved from the data store 224 for these users to the registration engine and receive a response from the registration engine indicating whether the users are registered or not. The suggestion engine 206 can interact with the registration engine directly or via an API. In some implementations, if the any users of the suggested group are not registered with the social network, the suggestion engine 206 can generate and send invitations to unregistered users inviting them to join the social network. The invitation can include information inviting the user to agree to join the social network and be connected to the other users of the suggested group. In other implementations, the suggestion engine 206 can exclude the unregistered users from the suggested group.

In response to a group request being received, the suggestion engine 206 can cooperate with the interface engine 212 to format, generate, and transmit one or more group suggestions to a client device 112 of the requestor for presentation. Various examples of user interfaces for presenting group suggestions to a user are described with reference to at least FIGS. 6A, 6B, and 7. In other implementations, the suggestion engine 206 can format and send the group suggestions independently via the communication unit 218 and the network 132. Further, the suggestion engine 206 can store any information associated with receiving and processing the group requests, and generating and sending the group suggestions in the data store 224 for later access by the suggestion engine 206 or the other components 104, 108, 202, 204, 208, 210, 212 and/or 214 of the social network server 102. Additionally or alternatively, the suggestion engine 206 may provide this information directly to other components 104, 108, 202, 204, 208, 210, 212, and/or 214 of the social network server 102.

The ranking module 208 can rank the users of a cluster identified by the cluster processor 204. The ranking module 208 is coupled to the cluster processor 204 to receive a ranking signal, and responsive thereto, to rank the users of a cluster identified by the ranking signal. In some implementations, information about the cluster is included with the ranking signal. In other implementations, the ranking module 208 retrieves information about the cluster from the data store 224, as stored by the cluster processor 204. The ranking module 208 can rank the users of a cluster based on their interaction level. Each user's interaction level reflects the level of his/her participation in the conversation or conversations reflected by the one or more electronic messages that the cluster of related users was identified from by the cluster processor 204. The more a user participated in the conversation or conversations, the higher that user is ranked relative to the other users of the cluster. The ranking module 208 can determine an interaction level for each user of the cluster based on the attributes identified by the cluster processor 204, and further process the cluster data and message-related information. For example, the ranking module 208 can, for each user of the cluster, determine which users initiated conversations by sending/posting messages; how many times the users were referenced by electronic messages associated with the users; how many times the users interacted with the electronic messages (e.g., by responding to a message, commenting on a message, etc.); etc., and the ranking module 208 can use this information to determine the interaction levels for the users. To rank the users, the ranking module 208 can use the cluster data generated by the cluster processor 204 and stored in the data store 224 or provided to the ranking module 208 directly by the cluster processor 204. The ranking module 208 can also perform independent processing of the message-related information and any supplemental information retrieved from external information sources about the users of a cluster.

If more than one cluster of related users is identified by the cluster processor 204, the ranking module 208 can rank these clusters based on how strongly connected the users of the clusters are. For example, clusters of related users that, based on the electronic messages exchanged between them, are well-acquainted; engage in activities together (e.g., dinner, sporting events, etc.); frequently share messages about various topics; share photographs, anecdotes, videos, etc.; work together; etc., are ranked higher by the ranking module 208 relative to clusters including users that do not associate in one or more of these ways. In another example, the more ways the users of a social cluster are determined to be connected by the cluster processor 204, the higher the cluster may be ranked by the ranking module 208 relative to the other social clusters it identifies.

The ranking module 208 may store the results of the processing and ranking performed by it, including data describing the ranking of the users of a social cluster and the ranking of two or more social clusters in the data store 224 for use by the other components 104, 202, 206, 208, 210, 212, and 214, or may provide this information or portions thereof to these other components directly. In some implementations, the ranking module 208 can send a completion signal to the cluster processor 204 indicating that the ranking is complete. The ranking module 208 can store the results of the ranking in the data store 224 for access by the cluster processor 204 or may provide the results, or a portion thereof, with the completion signal to the cluster processor 204.

The learning module 210 can receive a learning signal and process revisions included in a suggestion response to improve future group suggestions in response to receiving the learning signal. A suggestion response is a response received from a user in reply to that user receiving a group suggestion. The suggestion response may approve a group suggestion outright, including the members suggested for the group and the group name, or may include one or more revisions to the group that was suggested in the group suggestion. A revision can modify the membership of the group, a name for the group, etc. A revision can also include one or more tags or a description input by the users to describe the group. For example, the group suggestion may suggest a group that includes users 112a, 112b, 112c, and 112d, and the suggestion response may include revisions removing user 112b and adding user 112e.

The learning module 210 can process the revisions included in a suggestion response to improve the accuracy of future group suggestions generated by suggestion engine 206 and the information underlying those suggestions generated by the cluster processor 204. For example, the learning module 210 can determine whether certain users are repeatedly removed from suggested group by a particular user, and the cluster processor 204 can use this information exclude these users from the clusters it identifies and provides to the suggestion engine 206 for group suggestions for that user. In another example, the learning module 210 can process changes to group names made by a user to identify preferred naming patterns and the cluster processor 204 can use these naming patterns when generating future group name suggestions for that user. More globally, the learning module 210 can process revisions to determine the optimum make-up of a group. For example, the learning module 210 can process group membership modifications to determine the optimum average number of users to include in a group suggestion. The learning module 210 can store data describing the learning it performs in the data store 224 for access by the cluster processor 204 and/or the suggestion engine 206 when performing their respective operations.

The interface engine 212 is software, code, logic, or routines for preparing and providing information to one or more of the other entities of the system 100 via the network 132. In some implementations, the interface engine 212 may process and send the information upon receiving a signal from another component 202, 204, 206, 210, 212, and/or 214. For example, a signal may be received from the suggestion engine 206 instructing the interface engine 212 to provide a group suggestion to a client device 112 for presentation. In another example, the group creator 214 may signal the interface engine 212 to provide a summary of a user's groups on the social network. In yet another example, the social network application 104 or stream generation component thereof (not shown) may signal the interface engine 212 to format and send a group suggestion alongside message-related information (e.g., a content stream of a user that includes a group suggestion) to a client device 112 of the user for presentation. In a further example, the interface engine 212 can provide a group suggestion to a user asynchronous to information (e.g., electronic mail messages, content stream, etc.) that the group suggestion is associated with (e.g., responsive to receiving an Asynchronous JavaScript and XML (AJAX) or JavaScript Object Notation (JSON) request).

The information sent by the interface engine 212 may be processed by the interface engine 212 to include presentational information and the user application 114 may use the presentational information to form the look and feel of a user interface and then present the information to a user 126 via the user interface. For example, the electronic file(s) or data stream(s) may be formatted using a markup language (e.g., HTML, XML, etc.), style sheets (e.g., CSS, XSL, etc.), graphics, and/or scripts (e.g., JavaScript, ActionScript, etc.), and the user application 114 may interpret the interface instructions and render an interactive Web User Interface (WUI) for display on a client device 112 based thereon. Various example interfaces are described below with reference to at least FIGS. 6A, 6B, and 7. In other implementations, the user application 114 may determine the formatting and look and feel of the user interfaces independently. Using the user interfaces presented by the user application 114, the user can input commands selecting various user actions. For example, using these interfaces users can transmit group requests, requests to view their content streams, etc.

The interface engine 212 may be coupled to the message aggregator 202, the cluster processor 204, the suggestion engine 206, the ranking module 208, the learning module 210, and the group creator 214 to receive information generated or processed by these components. In some implementations, the interface engine 212 may retrieve information from the memory 220, the data store 224, and/or the social graph 106 that was stored by these components or is supplemental to information stored by these components.

The group creator 214 is software, code, logic, or routines for creating groups of users in the social graph 106 based on one or more common features shared by the users. In some implementations, a user, using an associated interface displayed by the user application 114, can transmit instructions to the group creator 214 to define groups to organize the users he or she is connected with on the social network. For example, the user can define a group to include family members, a group to include friends, a group to include college buddies, a group to include users of the social network who share his/her interest in photography, etc. In other implementations, the group creator 214 can create groups based on a suggestion response. In particular, the group creator 214 can receive a suggestion response and create a group based on a group suggestion associated with the response.

By way of example, the suggestion engine 206 can generate and send a group suggestion to a user responsive to receiving a group request from that user. The user, via a group creative interface, can accept the group suggestion outright or modify the group suggestion and then accept it. Upon accepting the group suggestion, the user application 114 of the user generates and transmits a suggestion response describing the acceptance of the group suggestion, including any revisions to it, to the group creator 214, and the group creator 214, among other things, can create a group on the social network based on the group suggestion (and any revisions thereto).

A suggestion response may include information describing the group suggestion and any revisions thereto as input by the user who submitted the response. For example, the suggestion response may include an identifier by which the group suggestion is indexed in the data store 224 and information describing what the name of the group to be created by the group creator 214 should be. The suggestion response may also include information identifying the user who submitted the suggestion response. The group creator 214 can parse the information included in the suggestion response and create a group on the social network based thereon. In some implementations, based on information obtained from the suggestion response, the group creator 214 can access information associated with the response, including, for example, the corresponding group suggestion, social cluster(s), suggested group name(s), or other related information generated by the cluster processor 204 and/or the suggestion engine 206 from the data store 224, and use this information when creating a group on the social network based on the group suggestion.

If the suggestion response includes revision(s) to the group that was suggested, the group creator 214 can determine the revisions from the request and create the group on the social network based on the revisions. For example, if a revision modifies the membership of the suggested group or a name for the group, the group creator 214 can modify the membership of the suggested group (e.g., remove or add one or more users) or can modify the name of the suggested group, respectively, and then create the group on the social network based thereon. In one non-limiting example, the group suggestion suggests a group that includes users 112a, 112b, 112c, and 112d, the suggestion response includes revisions removing user 112b and adding user 112e, and the group creator 214 modifies the group suggestion to remove user 112b and add user 112e, and then creates a group on the social network based on the modified group suggestion.

The group creator 214 can act as a controller/request handler for receiving and acting upon the suggestion responses it receives. In some implementations, the group creator 214 sends a learning signal to the learning module 210 instructing it to process revisions included in the suggestion responses it receives. The learning module 210 may receive information describing a suggestion response and/or revisions directly from the group creator 214 (e.g., with the learning signal) or may access this information from the data store 224. In some implementations, the group creator 214, in cooperation with the interface engine 212, may send confirmation information to the client device 112 of the user indicating whether the group was created successfully based on the suggestion.

To create a group, the group creator 214 can define it in the social graph 106 in association with the users of the group. For example, the group creator 214 may create a record for the group in the social graph 106 that includes information about the group, including, for example, the users of the group, the group name, a description for the group, tags describing the group, etc. The group creator 214 may also update, in the social graph 106, profile information associated with each user of the group with information describing the group. Additionally, or alternatively, the group creator 214 may create explicit connections (e.g., $1^{st}$, $2^{nd}$, $3^{rd}$, etc., degree connections) between each of the users of the group (including the user who initially submitted the group request) in the social graph 106 by defining social graph connection information in the social graph 106 that includes social graph connections between each of these users. The group creator 214 may define the social graph connection information by generating and storing it in the social graph 106.

The data store 224 is information source for storing and providing access to information including, for example, message-related information, user-related information, cluster data, cluster-related information, suggestion-related information, registration-related information, user profile information, social network-related information, etc. In some implementations, the data store 224 is coupled for communication with the various components 104, 106, 108, 202, 204, 206, 208, 210, 212, 214, 218, and 220 of the social network server 102. In some implementations, the data store 224 stores message-related information (e.g., aggregated electronic messages), cluster data and ranking information, group suggestions, suggestion responses, records of the various requests that have been received (e.g., group requests, content stream requests, etc.), the clusters and the users associated with those clusters, information received from the other entities 110, 118, 120, 122, 124, 126, 128, and 130 of the system 100, etc.

In some implementations, the social network application 104, the seeding engine 108, the message aggregator 202, the cluster processor 204, the suggestion engine 206, the ranking module 208, the learning module 210, the interface engine 212, and the group creator 214 are coupled to the data store 224 via the bus 216 to manipulate, i.e., store, query, update and/or delete data included in the data store 224 using programmatic operations. In some implementations, the data store 224 includes a database management system (DBMS) operable on the social network server 102 or another computing device and storable in the memory thereof. For example, the DBMS could be a structured query language (SQL) DBMS. In these implementations, the social network server 102, and in particular, the social network application 104 and the seeding engine 108 (and their respective sub-components) are coupled to the DBMS to store data in multi-dimensional tables comprised of rows and columns, and manipulate, i.e., insert, query, update and/or delete, rows of data using programmatic operations (e.g., SQL queries and statements).

Additional structure and functionality of the seeding engine 108 including the message aggregator 202, the cluster processor 204, the suggestion engine 206, the ranking module 208, and the learning module 210; and the social network application 104 including the interface engine 212, and the group creator 214 are further discussed below with reference to at least FIGS. 3-7.

Figure 3:
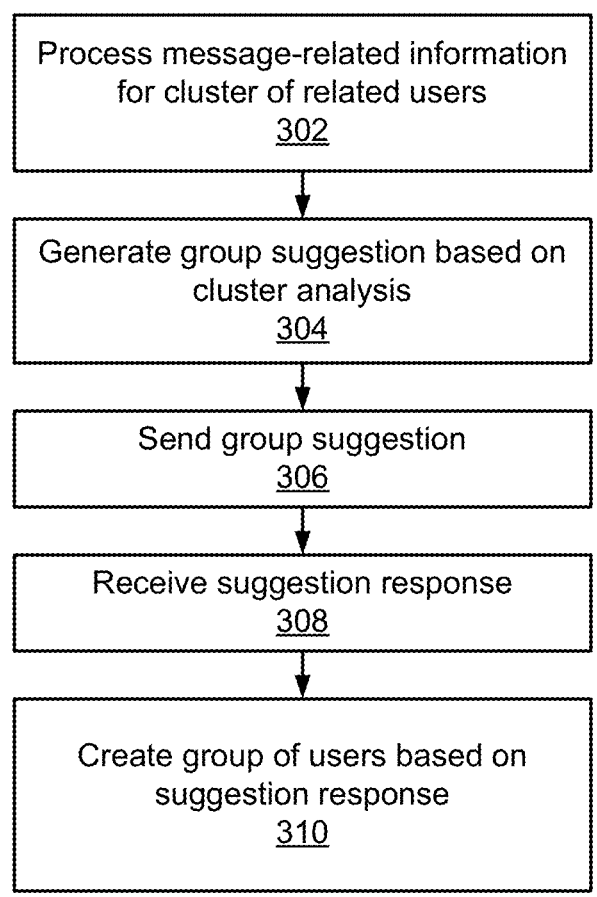
FIG. 3 is a flowchart of an example method for automatically suggesting groups based on past user interaction.

FIG. 3 is a flowchart of an example method 300 for automatically suggesting groups based on past user interaction. The method 300 begins by processing 302 message-related information of a first user for a cluster of related users. The cluster includes users who are associated in some way (e.g., by virtue of having interacted in the past by exchanging electronic messages). In some implementations, the message-related information may be processed upon user consent or may be pre-processed but not used until consent is obtained. The message-related information can be processed, in some implementations, by the cluster processor 204 for the cluster of related users. The cluster processor 204 can access the message-related information from a data store or receive the information from the message aggregator 202. In various implementations, the message-related information describes a plurality of electronic messages and the processing 302 of the message-related information includes processing the plurality of electronic messages for one or more past interactions between the first user and a plurality of other users and identifying the cluster of related users based on the one or more interactions. The method 300 can, in some implementations, process 302 the message-related information for the cluster of related users in response to receiving a request for the group suggestion from the first user. In other implementations, the social network application 104 or the seeding engine 108 can also initialize the method 300 by submitting the request for the group suggestion.

The method 300 continues by generating 304 a group suggestion based on the cluster of related users surfaced in block 302. The group suggestion may include a suggestion that a group, which includes users from the cluster, be created on the social network. In some implementations, the group suggestion is generated by the suggestion engine 206. For example, the cluster processor 204 can process the electronic messages of the user for cluster of users who are related, and the suggestion engine 206 can create the group suggestion based on the cluster. Next, the method 300 sends 306 the group suggestion to a user for presentation. In some implementations, to send the group suggestion, the suggestion engine 206 transmits the group suggestion via the network 132 to a client device 112 of the user 116. For example, the group suggestion may be provided to the user 116 while accessing an interface associated with the social network application 104. In other examples, the group suggestion may be provided to the user 116 via an electronic communication, for example, an electronic mail message, a social network notification sent via an internal messaging system of the social network application 104, etc.

Responsive to sending a group suggestion to the user, the method 300 receives 308 a suggestion response from the user. The suggestion response may approve the group suggestion provided to the user with or without revisions. For example, the suggestion response may approve the group outright, include a revised name for the group, add members to the group, remove the members from the group, merge the suggested group with an existing group, include a description for the group, include keywords/tags describing the group, etc. In some implementations, the group creator 214 receives the suggestion response and acts as a controller for managing the instructions included therewith. For example, the group creator 214 can process the suggestion response for any revisions, modify the group suggested in the group suggestion to include those revisions, signal the learning module 210 to process the suggestion response and/or revisions to improve future cluster determinations and corresponding group suggestions, and create a group in the social graph 106 of the social networking service based on the suggestion response. In other implementations, other components of the seeding engine 108 or the social network application 104 can act as the controller for receiving and processing the suggestion response, and can signal the learning module 210 and the group creator 214 to perform their respective operations.

Next, the method 300 continues by creating 310 a group of users based on suggestion response. In some implementations, if the suggestion response approves the group suggested in the group suggestion, the method 300 creates 310 a group on the social networking service using the group suggestion. In other implementations, if the suggestion response includes revisions to the group suggested in the group suggestion, the method 300 creates 310 the group based on the group suggestion and the revisions thereto. The method 300 then terminates.

Figure 4:
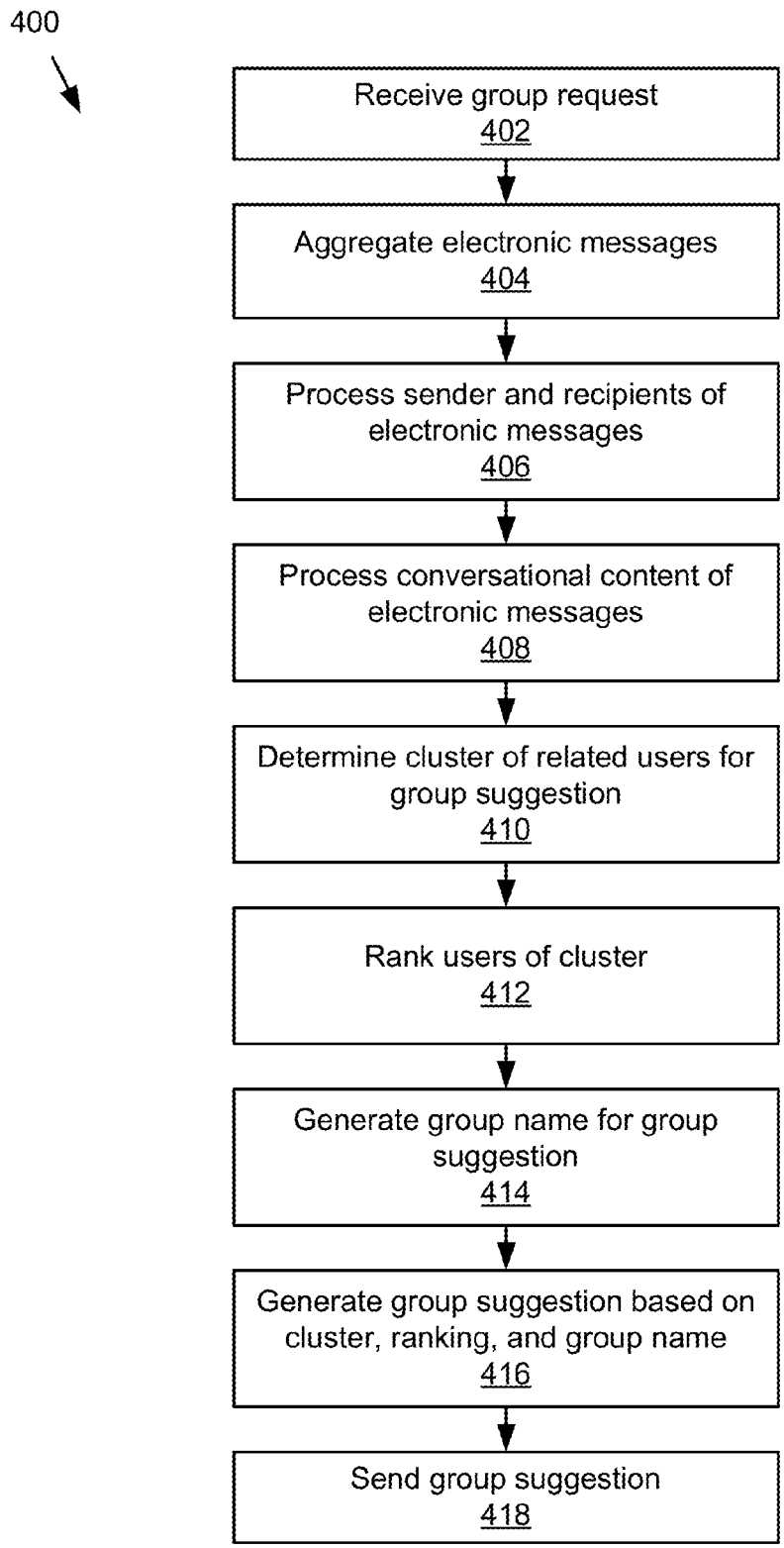
FIG. 4 is a flowchart of another example method for automatically suggesting groups based on past user interaction.

FIG. 4 is a flowchart of another example method 400 for automatically suggesting groups based on past user interaction. It should be understood that the method 400 is, in many respects, compatible with, and in some cases, an expansion of the method 300 discussed above, and that other methods based on the combination of various aspects of these methods are contemplated and within the scope of the present disclosure. The method 400 begins by receiving 402 a group request (i.e., a request for a group suggestion). In some implementations, the group request may be received from the user application 114 that is operating on a client device 112 of the user 116. For example, the user 116 may be interacting with a group creation interface for creating groups on a social networking service or with a content stream interface for viewing and interacting with content in that user's content stream. Various non-limiting examples of a group creation interface 600 are described below with reference to at least FIGS. 6A and 6B. In other implementations, the group request may be auto-generated by the seeding engine 108 or received from the social network application 104 or another entity of the system 100, as discussed elsewhere herein.

The method 400 continues by aggregating 404 the electronic messages of the user associated with the group request from one or more information sources. The information sources may include the data store 224 or any of the computing or storage devices coupled to the social network server 102, either directly or via the network 132. In some implementations, the electronic messages may be aggregated upon user consent or may be aggregated but not used until consent is obtained. The electronic messages being aggregated may include one or more of electronic mail messages, SMS/MMS messages, instant messages, social network posts, social network notifications, and micro blog posts. In some implementations, the electronic messages of all users of the social networking service are aggregated in advance and stored and accessible from a data store (e.g., the data store 224), and when the group request is received, electronic messages of the user associated with the group request are processed in block 406. In other implementations, the electronic messages of the user associated with the group request are aggregated after the group request has been received in block 402. Additionally or alternatively, the method 400 may aggregate and store a portion of the user's electronic messages in advance at various intervals and aggregate and store a remaining portion (e.g., the user's most recent electronic messages) after the group request is been received in block 402. Other implementations are also contemplated.

Next, the method 400 processes 406 the electronic messages to determine the users that are associated with the electronic messages. In some implementations the cluster processor 204 determines the users associated with the electronic messages by identifying the senders and recipients of the electronic messages, the users who posted and interacted with the electronic messages, etc. For example, the electronic messages may include user data describing, for example, the senders and recipients of the electronic messages, the posters of electronic messages, commenters that comment on the electronic messages, etc., and the method 400 may process 406 this information to determine the users that are associated with the electronic messages. The method 400 can also process 408 the conversational content of electronic messages to determine which users are discussed by the messages, interacted with the messages, etc. In some implementations, the cluster processor 204 processes this conversational content.

The method 400 continues by determining 410 a cluster of related users for use in a group suggestion based on the processing performed in blocks 406 and 408, and then ranking 412 the users of the cluster. For example, the cluster processor 204 can determine the cluster of related users based on various attributes of the electronic messages processed in blocks 406 and 408, and can then signal the ranking module 208 to rank the users of the cluster based on their relative interaction with one another as conveyed by the electronic messages. In some implementations, to rank the users, the method 400 may determine interaction levels for the users of the cluster of related users and rank these users based at least in part on the interaction levels. For example, the interaction levels may respectively describe a level of interaction between the user associated with the group request and each of the users of the cluster of related users. The method 400 then generates 414 a suggestion or suggestions for a group name to be used in block 414 when generating the group suggestion. In some implementations, the suggestion engine 206 generates a suggestion for a group name based on the processing performed by the cluster processor 204 in blocks 406 and/or 408, respectively. For example, the cluster processor 204 may generate a group name based on the context of the electronic messages associated with the cluster of related users. By way of illustration, if the users of the cluster exchanged electronic messages about a particular topic, the cluster processor 204 may generate a group name based on that topic.

Next, the method 400 generates 416 a group suggestion based on the cluster of related users determined in block 410 and the group name(s) generated in block 414. For example, the group suggestion can be generated by the suggestion engine 206 to suggest that a group be created on the social network by the user associated with the group request that includes the related users from the cluster and is named using the group name. The method 400 can also generate the group suggestion to reflect the ranking of the users of the cluster performed in block 412. Next, the method 400 sends 418 the group suggestion to the user for presentation and is then complete and ends. It should be understood, however, that once the group suggestion has been provided for presentation by the method 300 or 400, the user can interact with the group suggestion via an associated interface (e.g., see example interfaces discussed with reference to FIGS. 6A, 6B, and 7) to accept, reject or modify the group suggestion.

Figure 5:
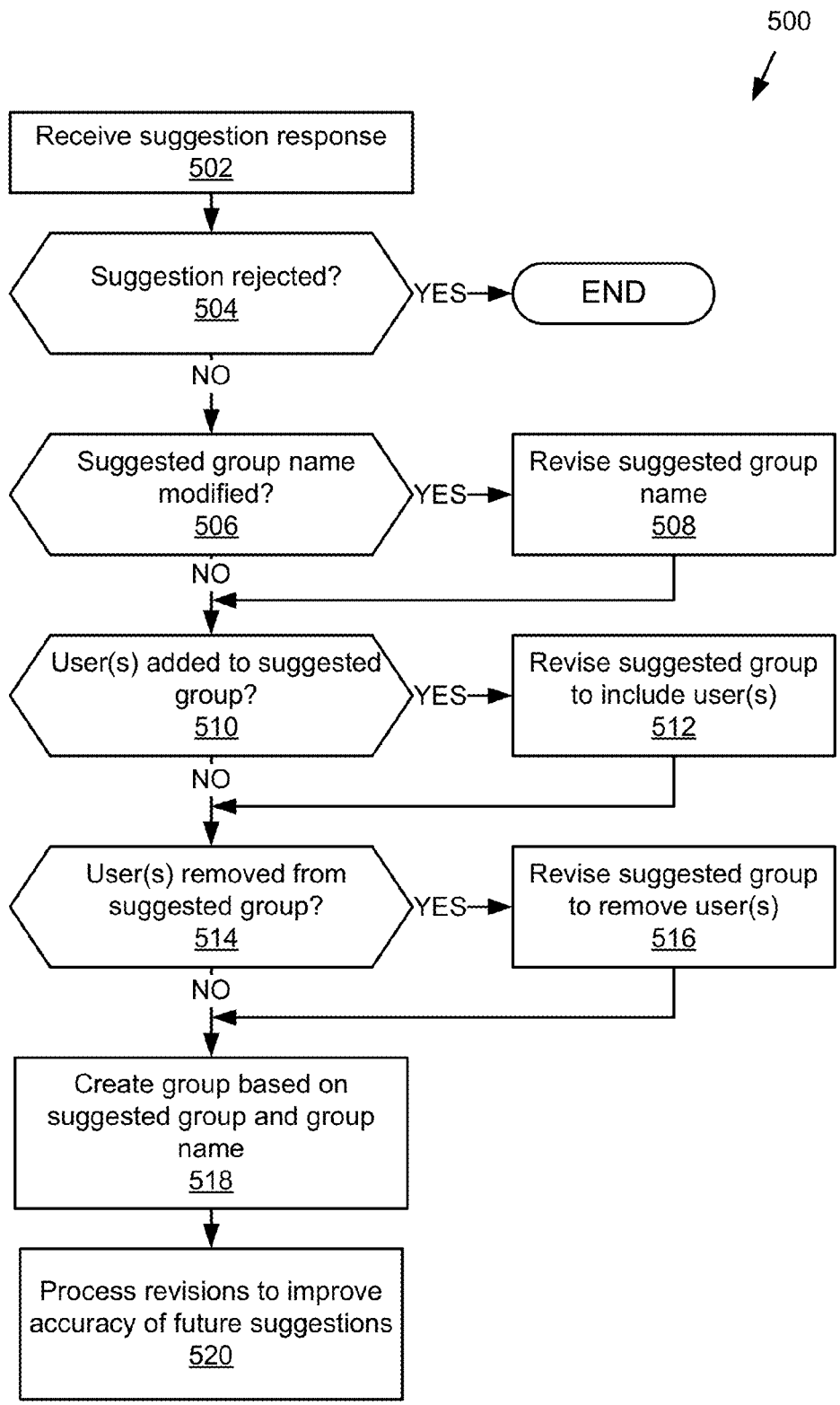
FIG. 5 is a flowchart of an example method for creating a group based on a group suggestion and improving the accuracy of future group suggestions.

FIG. 5 is a flowchart of an example method 500 for creating a group based on a group suggestion and improving the accuracy of future group suggestions. It should be understood that this method 500 is compatible and may be combined, in whole or in part, with the other methods and operations discussed herein including methods 300 and 400. The method 500 begins with a group suggestion having been provided to a user, as discussed above with reference to at least methods 300 and 400, for example. In block 502, the method 500 receives 502 a suggestion response. As previously discussed above with reference to at least FIG. 2, a suggestion response can be a response received from a user in reply to that user receiving a group suggestion. In some implementations, the suggestion response may approve a group suggestion outright, including the members suggested for the group and the group name, or may include one or more revisions to the group that was suggested in the group suggestion.

If the method 500 determines 504 that the suggestion response has rejected the group suggestion, the method 500 is complete and ends. If the method 500 determines 504 that the suggestion response has not rejected the group suggestion, the method 500 proceeds to process any revisions to the group suggestion. For example, a user 116a may be presented with a group suggestion by the user application 114 operating on the client device 112a of the user 116a, which includes users 116b and 116n and a name suggestion for the group (e.g., "Close Friends"). The user 116a, using a group creation interface rendered by the user application 114 may provide input accept the group as suggested or may modify the group. For instance, using the group creation interface, the user 116a may provide input to remove user 112b and/or user 112n, to add one or more additional users, to modify the name suggestion (e.g., "Close Friends" to "College Friends"), etc. The types of revisions depicted in FIG. 5, which include modifying the group name, adding users, and removing users, are provided by way of example and other types of revisions to the group suggestion are also contemplated. For example, the user, using the group creation interface, could provide input to merge the group with a previously created group, merge two group suggestions into one, etc., and corresponding signals representing these revisions can be received by the method 500 and processed in a manner similar to the revisions depicted in FIG. 5.

If the method 500 determines 506 that the suggestion response revises the group name suggested in the group suggestion, the method revises 508 the group name accordingly. If the method 500 determines 510 that the suggestion response adds one or more users to suggested group, the method 500 revises 512 the suggested group to include the one or more additional users. If the method 500 determines 514 that the suggestion response removes one or more users from the suggested group, the method 500 revises 516 the suggested group to remove the one or more users. If, in blocks 506, 510, and 514, the method determines that no revisions are to be made, the method 500 continues to the next applicable block.

While not depicted in FIG. 5, in some implementations, after a group suggestion has been presented to a user, the method 500 can further suggest additional users that can be added to it. For example, the seeding engine 108 may receive a user addition request from the user who received and is interacting with the group suggestion via a group creation interface. A non-limiting example of this type of group creation interface is described in further detail below with reference to at least FIG. 6B. This user may be the same user who submitted the group request in block 402 (see FIG. 4). The user addition request may request that the seeding engine 108 identify additional users that can be added to the group being suggested. In some implementations, the suggestion engine 206 receives and processes the user addition request, and in doing so, uses the cluster data generated by the cluster processor 204 and/or queries the social graph 106 to determine which users to suggest as additions to the group. For example, the suggestion engine 206 may process the social graph and/or cluster data to determine which additional users would be the most relevant to the group. As a further example, when determining which additional users to suggest, the suggestion engine 206 can consider what other clusters identified by the cluster processor 204 the users from the suggested group appear in, and whether those clusters include any users that are absent from the suggested group. For example, the more times an absent user appears in clusters with the users from the suggested group, the more likely the user who received the group suggestion may be to agree to include that user. In another example, the suggestion engine 206 can suggest users that do not have a first degree social graph connection with the first user, but share first degree connections to one or more other users included in the group suggestion, as additional users.

In other implementations, an existing group defined in the social graph 106 can be updated using suggestions provided by the seeding engine 108. For example, a user may access a group creation interface similar to the interface described with reference to FIGS. 6A and 6B to modify or update an existing group on the social networking service. Upon doing so, the user application 114 may generate and send a group request requesting the seeding engine 108 suggest additional users that can be added to the group. The suggestion engine 206 may generate and provide the suggestions for these additional users based on the cluster processing and/or ranking performed by the cluster processor 204 and/or the ranking engine 208, as previously described. Using these suggestions, the user may select the additional user(s) he/she wishes to add to the existing group, and data reflecting the user's selections may be sent to the group creator 214 for it to use to modify the group's definition in the social graph 106 to include the additional user(s).

Once the applicable operations in blocks 506 to 516 are complete, the method 500 creates 518 the group based on the suggested group and group name, as dictated by the suggestion response. If the suggested group or group name was revised by the suggestion response, the group created in block 518 includes those revisions. In some implementations, the group creator 214 creates the group by defining the group in the social graph 106, as discussed above with reference to at least FIG. 2. The group created in block 518 may be a private group or a group that is initially shared among all of the users of the group, including the user who initiated the creation of the group. A private group is a group created in the social graph 106 for the user who provided the suggestion response. In some implementations, the method 500 may automatically determine whether to create a private or shared group based on the level of interactivity within the group, as determined previously by the cluster processor 204 and/or the ranking module 208. For example, a group which is based on cluster of users determined by the cluster processor 204, in cooperation with the ranking module 208, to be highly participatory, may be created as a shared group by the group creator 214, while a group which is based on a cluster of users determined by the cluster processor 204, in cooperation with the ranking module 208, to be less interactive, may be created as a private group by the group creator 214. In other implementations, the suggestion engine 206 may including a suggestion of whether a group being suggested should be private or shared in the group suggestion. For example, the user viewing the group suggestion may accept the private or shared suggestion or modify it in the corresponding suggestion response received in block 502, and the method 500 may then create the group in block 518 based thereon.

Next, the method 500 processes 520 any revisions included in the suggestion response to improve the accuracy of future suggestions. For example, the method 500 can process the user input included in the suggestion response from the user providing it for one or more revisions to the group suggestion, can generate accuracy improvement data based at least in part on the one or more revisions, and based on the message-related information and the accuracy improvement data, may generate one or more subsequent group suggestions having improved suggestions for group members, names, group scope (e.g., private vs. shared), etc. In some implementations, the learning module 210 processes the revisions included in a suggestion response to determine a preferred naming convention for the corresponding user's groups, which users not to suggest in future group suggestions (e.g., because they are repeatedly removed, are never selected as additions, etc.), what user attributes (e.g., gender, age, hobbies, preferences, etc.) describe the users who are routinely removed or added to a particular group, etc. This information can be stored in the data store 224 as accuracy improvement data by the learning module 210 for later use by the cluster processor 204 when determining user clusters for future group suggestions. It should be understood that the learning module 210 is not limited to using revisions to improve the accuracy of future group suggestions, but may also use other indicia and data, including, for example, the characteristics and make-up of groups that are created by the group creator 214, whether additional suggestions provided by the suggestion engine 206 in response to receiving user addition requests are accepted, etc. Once the operations in block 520 are complete, the method 500 is complete and ends.

Figure 6A:
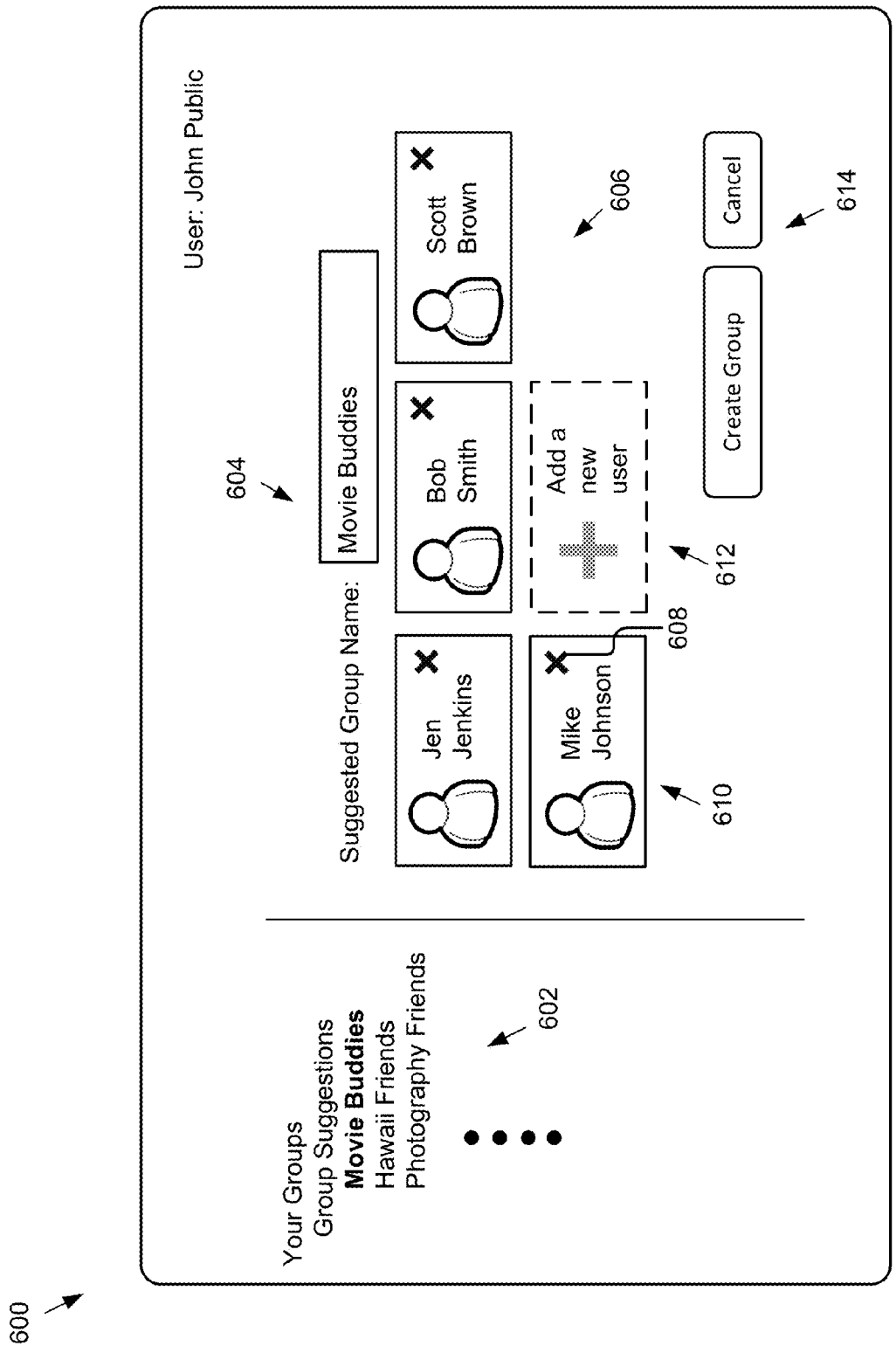
FIGS. 6A and 6B are graphic representations of an example group creation interface for viewing and creating a group based on a group suggestion.
Figure 6B:
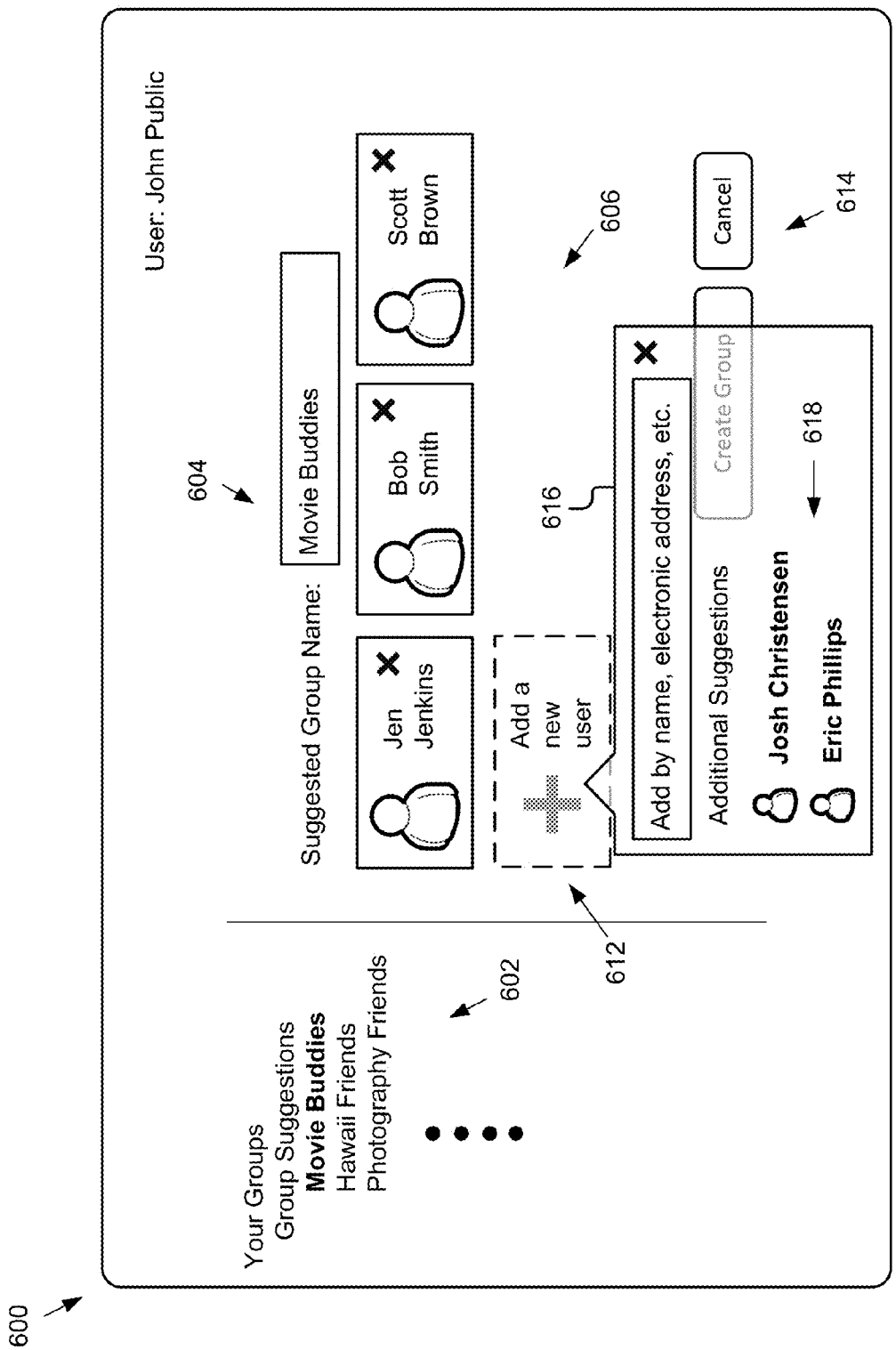

FIGS. 6A and 6B are graphic representations of a group creation interface 600 for creating a group based on a group suggestion. The user interface 600 can be generated by the user application 114 operating on a client device 112 and interacted with by a user 116. In the depicted implementation, the group creation interface 600 includes a menu region 602 and a definition region 606. The menu region 602 includes selectors for selecting various interfaces for viewing and creating groups on the social networking service. As an example, FIG. 6A depicts a group creation interface 600 for creating a group called "Movie Buddies" based on a group suggestion. The menu region 602 also shows other group suggestions for groups called "Hawaii Friends," "Photography Friends," etc., which were generated and provided by the seeding engine 108 based on messages exchanged between various clusters of users, as discussed above with reference to at least FIG. 2. Any number of group suggestions may be made available to the user in the menu region 602. For example, upon receiving a request for viewing group suggestions, the seeding engine 108 may generate and provide any number of group suggestions. In a further example, the suggestion engine 206, in cooperation with the cluster processor 204 and/or the ranking engine 208, may determine which groups are the most suitable for suggestion, and may provide a list/summary of the suggested groups for presentation to and selection by the user via the user application 114, for example, in the menu region 602. While not depicted, in some implementations, more than one group suggestion can be provided to the user application 114 by the suggestion engine 206 and can be displayed together in the same group creation interface 600. Using this interface, a user can perform the actions described herein, as well as combine two or more group suggestions into a single group, merge group suggestions with an existing group, etc.

The definition region 606 includes a group name field 604, tile regions 610 corresponding to the users included in the suggested group, a user addition tile 612 for adding one or more new users to the suggested group, and action elements 614 for creating a group or canceling out of the group creation interface 600. The group name field 604 can display the suggested group name determined by the cluster processor 204 and included in the group suggestion by the suggestion engine 206. In some implementations, the user viewing the interface 600 can modify the suggested group name displayed in the group name field 604. In other implementations, no group name is suggested and the user defines the group name by inputting it into the group name field 604. In the depicted implementation, the group name field 604 is a text entry field. In other implementations, the group name field 604 is a combination drop-down menu and text entry element that displays multiple group name suggestions for selection/modification by the user. Other configurations are also contemplated.

The tile regions 610 correspond to the users included in the group suggestion. As depicted, the tile regions 610 include the names and thumbnail images of the users. However, any information about the users may be displayed in the tile regions, including, for example, indicia of the users rankings, information from the electronic messages from which users were identified by the cluster processor 204, information from the social graph 106 about the users, including information from the users' profiles, electronic links to the users' content streams or profiles, etc. In some implementations, the tile regions 610 are sorted from top to bottom and left to right to reflect the ranking performed by the ranking module 208. The tile regions can include a removal button 608 which provides the user interacting with the group creation interface the functionality of removing one or more of the users from the group. The action elements 614 include a button for creating the group as defined in the definition region 606, and a button for canceling out of the group creation interface 600. In some implementations, when the button for creating the group is selected, the user application 114 generates and transmits a suggestion response to the social network server 102. The suggestion response can, for example, include data describing the group name and the users to be included in the group. In some implementations, the user application 114 can generate the suggestion response based on the input provided by the user interacting with the group creation interface 600. As an example, the suggestion response may be generated to include data referencing the group suggestion and any revisions to the group suggestion, including revisions to the suggested group name input into group name field 604 and the users added or removed from the definition region 606.

Relative to FIG. 6A, FIG. 6B depicts the removal of a user from the group suggestion and the selection to add a user to the group suggestion. For example, when viewing FIG. 6B relative to FIG. 6A, the tile region 610 for a user named "Mike Johnson" has been removed using the removal button 608 associated with that tile and a user addition dialog is displayed in FIG. 6B responsive to the user addition tile 612 having been selected. In the depicted implementation, the user addition dialog 616 includes suggestions 618 for additional users that could be added to the group. The suggestion engine 206 may generate and provide these suggestions to the user application 114 for display via the user addition dialog 616. For example, the suggestion engine 206 may suggest these additional users based on the cluster data generated by the cluster processor 204, social graph information stored in the social graph 106, ranking results produced by the ranking module 208, etc. In one non-limiting example, the group suggestion displayed in FIGS. 6A and 6B may have been created by the suggestion engine 206 based on a subset of users from a cluster identified by the cluster processor 204. This subset may reflect the top four users as ranked by the ranking module 208. To suggest the additional users, the suggestion engine 206 may provide the fifth-ranked and sixth-ranked users from the cluster. Other implementations, including those discussed above with reference to at least FIG. 5, are also contemplated.

Figure 7:
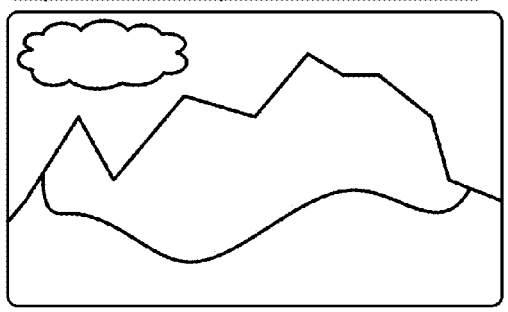
FIG. 7 is a graphic representation of an example content stream interface including a group suggestion dialog.

FIG. 7 is a graphic representation of an example content stream interface 700 including a group suggestion dialog 712. In the depicted implementation, the content stream interface 700 includes a menu region 702 and the content region 704. In some implementations, the menu in the menu region 702 is made up of electronic links that link to corresponding network-based content served by the social network server 102 via the network 132. In the depicted implementation, the menu region 702 includes hyperlinks for navigating the user's content stream by group and viewing the group suggestions generated and provided by the seeding engine 108. As an example, the electronic link labeled "Family" may correspond to a group that includes the user's family members who are users of the social networking service, and if the user selects that link, the content region 704 is refreshed to display content posted by these users. In another example, the content displayed in the content region 704 may be automatically determined by the social network application 104. For example, the social network application 104 may automatically filter-out, from the content region 704, content from other users that the user, John Public, rarely interacts with on the social networking service 104 or is not strongly connected to in the social graph 106 relative to the other users the user is connected with.

The content region 704 includes, among other elements, a message region 706, and a comment field 714. The message region 706 can include posts made by various users, affirmations of the posts by various users, comments made by various users about the posts, etc. The posts displayed in the content region 704 (initial posts, affirmations of the posts, comments about posts, etc.) are included in the definition of electronic messages and can be aggregated by the message aggregator 202 and processed by the cluster processor 204, as described above with reference to at least FIG. 2. In the depicted implementation, the message region 706 depicts a message thread discussing a photograph posted by another user, Bob Smith. The message thread includes a post of a photograph and comments provided by various users in response to the posting of the photograph. For example, two users (e.g., David Johnson, John Ryan, etc.) posted comments about Bob Smith's photograph.

The comment field 714 can include a text box for inputting a comment about the post with which it corresponds. The comment field 714 also includes selectors for submitting the comment or canceling-out of submitting the comment. While the comment field is depicted as accommodating text, it should be understood that any type of content including, for example, audio files, video files, graphics files, electronic references to the forgoing, etc., may be included in a comment input into the comment field. The group suggestion dialog 712 is a dialog for displaying a group suggestion generated and sent by the seeding engine 108 to the user application 114 for presentation. In the depicted implementation, the group suggestion dialog includes confirmation buttons 708 and 710 for approving or rejecting the group suggestion, respectively. In other implementations, the confirmation buttons 708 and 710 could include a button for opening a group creation interface 600 for further defining the group suggestion.

In some implementations, the seeding engine 108 generates and provides the group suggestion in response to the user interacting with the content stream interface 700. For example, the user application 114 can send a signal describing the user's interaction with the content in the content region 704 (e.g., paging/scrolling the interface 700, inputting a comment, hovering over a post, slowing the paging/scrolling to read a post, etc.) and the seeding engine 108 can treat this signal as a group request and provide one or more group suggestions in response. As depicted, the user, John Public, input a comment into comment field 714 about the photograph posted by Bob Smith. In response, the user application 114 displayed a group suggestion dialog 712 including a group suggestion generated by the suggestion engine 206 based on users associated with the posts (e.g., Bob, David, Jill, Seth, Mike, and John), the subject matter of the posts (e.g., photography), and previous interaction between those users in related photography posts. In another example, the group suggestion may be generated and provided contemporaneously with the content displayed in the content region 704. For instance, in preparing the content for provision to the user application 114, the social network application 104 may interact with the seeding engine 108 to have the content processed for possible group suggestions.

It should also be understood that the user interfaces described in FIGS. 6A, 6B, and 7 are merely examples and that the interface elements may have a variety of distinct formats, content, positions within the window, and combinations, all of which are encompassed by the scope of the present disclosure.

Various implementations for automatically suggesting groups based on past user interaction have been described. In the above description, for purposes of explanation, numerous specific details are set forth in order to provide a thorough understanding of this disclosure. It should be understood, however, that the systems, methods, and computer products described herein can be practiced without these specific details. In other instances, structures and devices are shown in block diagram form in order to avoid obscuring the disclosure. For example, the various components, operations, and/or features are described in some implementations above with reference to user interfaces and particular hardware. However, the present disclosure applies to any type of computing device that can receive data and commands, and any peripheral devices providing services.

Reference in the specification to "one implementation," "an implementation," "some implementations," etc., means that a particular feature, structure, or characteristic described in connection with the implementation is included in at least one implementation. The appearances of the phrase "in one implementation" or "in some implementations" in various places in the specification are not necessarily all referring to the same implementation.

Some portions of the detailed descriptions above are presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms including, for example, "processing" or "computing" or "calculating" or "defining" or "identifying" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, for example, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosure can take the form of an entirely hardware implementation, an entirely software implementation or an implementation containing both hardware and software elements. In a preferred implementation, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the present disclosure is not described with reference to any particular programming language. It will be appreciated that a variety of programming languages may be used to implement the teachings of the disclosure as described herein.

The foregoing description of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, it should be understood that the routines, features, attributes, methodologies and other aspects of the present disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way. Additionally, the present disclosure is in no way limited to implementation in any specific programming language, or for any specific operating system or environment. Accordingly, the present disclosure is intended to be illustrative, but not limiting, of the subject matter set forth in the following claims.

What is claimed is:

1. A computer-implemented method comprising:
    aggregating message-related information of a first user from a plurality of electronic messages associated with the first user;
    identifying a cluster of related users based on the aggregated message-related information of the first user and conversations included in the plurality of electronic messages in which the cluster of related users discussed a similar subject matter;
    determining interaction levels for the cluster of related users, the interaction levels describing a level of interaction between the first user and related users of the cluster of related users;
    ranking the cluster of related users based on the interaction levels;
    determining a group scope based on the interaction levels;
    generating a group name based on the similar subject matter;
    generating a group suggestion suggesting a group be created on a social networking service based on the ranking of the cluster of related users, the group suggestion including the determined group scope and the generated group name;
    determining that the first user is participating in at least one of the conversations;
    responsive to determining that the first user is participating in the at least one of the conversations, sending the group suggestion to the first user for presentation;
    receiving a response from the first user including user input provided in response to the sending of the group suggestion; and
    creating the group of users on the social networking service based on the response.

2. The computer-implemented method of claim 1, wherein the message-related information describes a plurality of electronic messages and the processing of the message-related information includes processing the plurality of electronic messages for one or more past interactions between the first user and a plurality of other users and identifying the cluster of related users based on the one or more past interactions.

3. The computer-implemented method of claim 2, wherein the message-related information includes conversational content and user data associated with the plurality of electronic messages and the processing of the message-related information includes processing the conversational content and the user data for the one or more past interactions.

4. The computer-implemented method of claim 1, comprising:
    receiving a group request from the first user requesting the group suggestion be provided; and
    aggregating the message-related information from one or more information sources storing electronic messages of the first user.

5. The computer-implemented method of claim 4, wherein the electronic messages include one or more of electronic mail messages, SMS/MMS messages, instant messages, social network posts, social network notifications, and micro blog posts.

6. The computer-implemented method of claim 1, comprising:
    processing the message-related information for a group name, wherein the generating of the group suggestion is based on the group name.

7. The computer-implemented method of claim 1, wherein the generating of the group suggestion further includes generating the group suggestion to reflect the ranking of the related users of the cluster.

8. The computer-implemented method of claim 1, comprising:
    processing the user input included in the response from the first user for one or more revisions to the group suggestion;
    generating accuracy improvement data based on the one or more revisions; and
    generating a second group suggestion suggesting a second group be created on the social networking service based on the message-related information and the accuracy improvement data.

9. A computer program product comprising a non-transitory computer-usable medium including a computer-readable program, wherein the computer-readable program, when executed on a computer, causes the computer to:

aggregate message-related information of a first user from a plurality of electronic messages associated with the first user;

identify a cluster of related users based on the aggregated message-related information of the first user and conversations included in the plurality of electronic messages in which the cluster of related users discussed a similar subject matter;

determine interaction levels for the cluster of related users, the interaction levels describing a level of interaction between the first user and related users of the cluster of related users;

rank the cluster of related users based on the interaction levels;

determine a group scope based on the interaction levels;

generate a group name based on the similar subject matter;

generate a group suggestion suggesting a group be created on a social networking service based on the ranking of the cluster of related users, the group suggestion including the determined group scope and the generated group name;

determine that the first user is participating in at least one of the conversations;

responsive to determining that the first user is participating in the at least one of the conversations, send the group suggestion to the first user for presentation;

receive a response from the first user including user input provided in response to the group suggestion being sent; and create the group of users on the social networking service based on the response.

10. The computer program product of claim 9, wherein the message-related information describes a plurality of electronic messages and to process the message-related information includes processing the plurality of electronic messages for one or more past interactions between the first user and a plurality of other users and identifying the cluster of related users based on the one or more past interactions.

11. The computer program product of claim 10, wherein the message-related information includes conversational content and user data associated with the plurality of electronic messages and to process the message-related information further includes processing the conversational content and the user data for the one or more past interactions.

12. The computer program product of claim 9, wherein the computer-readable program further causes the computer to:
receive a group request from the first user requesting the group suggestion be provided; and
aggregate the message-related information from one or more information sources storing electronic messages of the first user.

13. The computer program product of claim 12, wherein the electronic messages include one or more of electronic mail messages, SMS/MMS messages, instant messages, social network posts, social network notifications, and micro blog posts.

14. The computer program product of claim 9, wherein the computer-readable program further causes the computer to:
process the message-related information for a group name, wherein to generate the group suggestion includes generating the group suggestion based on the group name.

15. The computer program product of claim 9, wherein to generate the group suggestion further includes generating the group suggestion to reflect the ranking of the related users of the cluster.

16. The computer program product of claim 9, wherein the computer-readable program further causes the computer to:

process the user input included in the response from the first user for one or more revisions to the group suggestion;

generate accuracy improvement data based on the one or more revisions; and generate a second group suggestion suggesting a second group be created on the social networking service based on the message-related information and the accuracy improvement data.

17. A system comprising:
a processor; and
a memory storing instructions that, when executed, cause the system to:
aggregate message-related information of a first user from a plurality of electronic messages associated with the first user;
identify a cluster of related users based on the aggregated message-related information of the first user and conversations included in the plurality of electronic messages in which the cluster of related users discussed a similar subject matter;
determine interaction levels for the cluster of related users, the interaction levels describing a level of interaction between the first user and related users of the cluster of related users;
rank the cluster of related users based on the interaction levels;
determine a group scope based on the interaction levels;
generate a group name based on the similar subject matter;
generate a group suggestion suggesting a group be created on a social networking service based on the ranking of the cluster of related users, the group suggestion including the determined group scope and the generated group name;
determine that the first user is participating in at least one of the conversations;
responsive to determining that the first user is participating in the at least one of the conversations, send the group suggestion to the first user for presentation;
receive a response from the first user including user input provided in response to the group suggestion being sent; and
create the group of users on the social networking service based on the response.

18. The system of claim 17, wherein the message-related information describes a plurality of electronic messages and to process the message-related information includes processing the plurality of electronic messages for one or more past interactions between the first user and a plurality of other users and identifying the cluster of related users based on the one or more past interactions.

19. The system of claim 18, wherein the message-related information includes conversational content and user data associated with the plurality of electronic messages and to process the message-related information further includes processing the conversational content and the user data for the one or more past interactions.

20. The system of claim 17, wherein the instructions further cause the system to receive a group request from the first user requesting the group suggestion be provided and aggregate the message-related information from one or more information sources storing electronic messages of the first user.

21. The system of claim 20, wherein the electronic messages include one or more of electronic mail messages, SMS/MMS messages, instant messages, social network posts, social network notifications, and micro blog posts.

22. The system of claim 17, wherein the instructions further cause the system to process the message-related information for a group name, wherein to generate the group suggestion includes generating the group suggestion based on the group name.

23. The system of claim 17, wherein to generate the group suggestion further includes generating the group suggestion to reflect the ranking of the related users of the cluster.

24. The system of claim 17, wherein the instructions further cause the system to process the user input included in the response from the first user for one or more revisions to the group suggestion, generate accuracy improvement data based on the one or more revisions, and generate a second group suggestion suggesting a second group be created on the social networking service based on the message-related information and the accuracy improvement data.

* * * * *